(12) United States Patent
Woodrow et al.

(10) Patent No.: US 10,672,277 B2
(45) Date of Patent: Jun. 2, 2020

(54) SYSTEMS AND METHODS FOR MANAGING SPACE AT A LOCATION FOR RECEIVING ASSETS

(71) Applicant: UATC, LLC, San Francisco, CA (US)

(72) Inventors: Alden James Woodrow, Oakland, CA (US); Alan Hugh Wells, San Rafael, CA (US); Maxwell MacGavin Pike, San Francisco, CA (US)

(73) Assignee: UATC, LLC, San Francisco, CA (US)

( * ) Notice: Subject to any disclaimer, the term of this patent is extended or adjusted under 35 U.S.C. 154(b) by 0 days.

(21) Appl. No.: 16/018,563

(22) Filed: Jun. 26, 2018

(65) Prior Publication Data
US 2019/0333383 A1 Oct. 31, 2019

Related U.S. Application Data

(60) Provisional application No. 62/662,996, filed on Apr. 26, 2018, provisional application No. 62/663,007, (Continued)

(51) Int. Cl.
*G08G 1/127* (2006.01)
*G08G 1/00* (2006.01)
(Continued)

(52) U.S. Cl.
CPC ........... *G08G 1/202* (2013.01); *G05D 1/0027* (2013.01); *G05D 1/0088* (2013.01); (Continued)

(58) Field of Classification Search
CPC ...... G08G 1/127; G08G 1/202; G05D 1/0088; G05D 1/0027; G07C 5/08; H04W 4/029; (Continued)

(56) References Cited

U.S. PATENT DOCUMENTS

2016/0189435 A1* 6/2016 Beaurepaire ........... G08G 1/005
705/13
2017/0267233 A1 9/2017 Minster et al.
(Continued)

FOREIGN PATENT DOCUMENTS

WO WO 2018/035403 2/2018

OTHER PUBLICATIONS

International Search Report and Written Opinion for PCT/US2019/029320, dated Jul. 23, 2019, 13 pages.

*Primary Examiner* — Anne Marie Antonucci
(74) *Attorney, Agent, or Firm* — Dority and Manning, P.A.

(57) ABSTRACT

In one example embodiment, a computer-implemented method for managing available capacity at a location for receiving an asset includes obtaining data indicative of one or more first assets that will arrive at a first location within a first transfer hub at an arrival time, the one or more first assets being associated with a first service provider. The method includes determining an available capacity at the first location within the first transfer hub for receiving the one or more first assets at the arrival time. The method includes moving one or more second assets positioned at the first location to a second location within the first transfer hub to increase the available capacity at the first location for receiving the one or more first assets at the arrival time.

16 Claims, 10 Drawing Sheets

Related U.S. Application Data filed on Apr. 26, 2018, provisional application No. 62/663,009, filed on Apr. 26, 2018.

(51) Int. Cl.
    *G05D 1/00*     (2006.01)
    *G07C 5/00*     (2006.01)
    *H04W 4/029*     (2018.01)
    *G05D 1/02*     (2020.01)

(52) U.S. Cl.
    CPC ............ *G05D 1/0297* (2013.01); *G07C 5/008* (2013.01); *G08G 1/127* (2013.01); *H04W 4/029* (2018.02)

(58) Field of Classification Search
    CPC .... G06Q 10/06; G06Q 10/0631; G06Q 50/28; G06Q 50/30
    See application file for complete search history.

(56) References Cited

U.S. PATENT DOCUMENTS

2017/0308094 A1   10/2017   Abe et al.
2017/0344003 A1   11/2017   Bostick et al.
2019/0179336 A1*   6/2019   Colijn .................. G05D 1/0291

\* cited by examiner

600

| CARGO ROUTE FOR ASSET (A1) INCLUDING CARGO (C1) | | | | |
|---|---|---|---|---|
| START LOCATION | SCHEDULED DEPARTURE TIME | TRANSPORTATION ROUTE(S) | END LOCATION | SCHEDULED ARRIVAL TIME |
| 470 | T0 | 491 | 410 | T1 |
| 410 | T2 | 433 | 414 | T3 |
| 414 | T6 | 435, 437 | 418 | T7 |
| 418 | T8 | 439 | 420 | T9 |
| 420 | T10 | 492 | 480 | T11 |

| TRANSFER SCHEDULE FOR TRANSFER HUB 414 | | | | |
|---|---|---|---|---|
| SCHEDULED TIME | START LOCATION | ASSET(S) | END LOCATION | JOCKEY |
| T1 | 510 | A2 | 536 | J1 |
| T1 | 510 | A3 | 540 | J2 |
| T1 | 512 | A5 | 542 | J4 |
| T2 | 512 | A4 | 538 | J3 |
| T2 | 510 | A6 | 536 | J1 |
| T2 | 542 | A5 | 522 | J4 |
| T3 | 512 | A7, A8 | 542 | J4 |
| T3 | 510 | A1 | 530 | J5 |
| T4 | 542 | A8 | 544 | J4 |
| T4 | 540 | A3 | 520 | J2 |
| T4 | 538 | A4 | 522 | J3 |
| T5 | 544 | A8 | 522 | J4 |
| T6 | 536 | A2, A6 | 520 | J1 |
| T6 | 530 | A1 | 520 | J6 |

*FIG. 7*

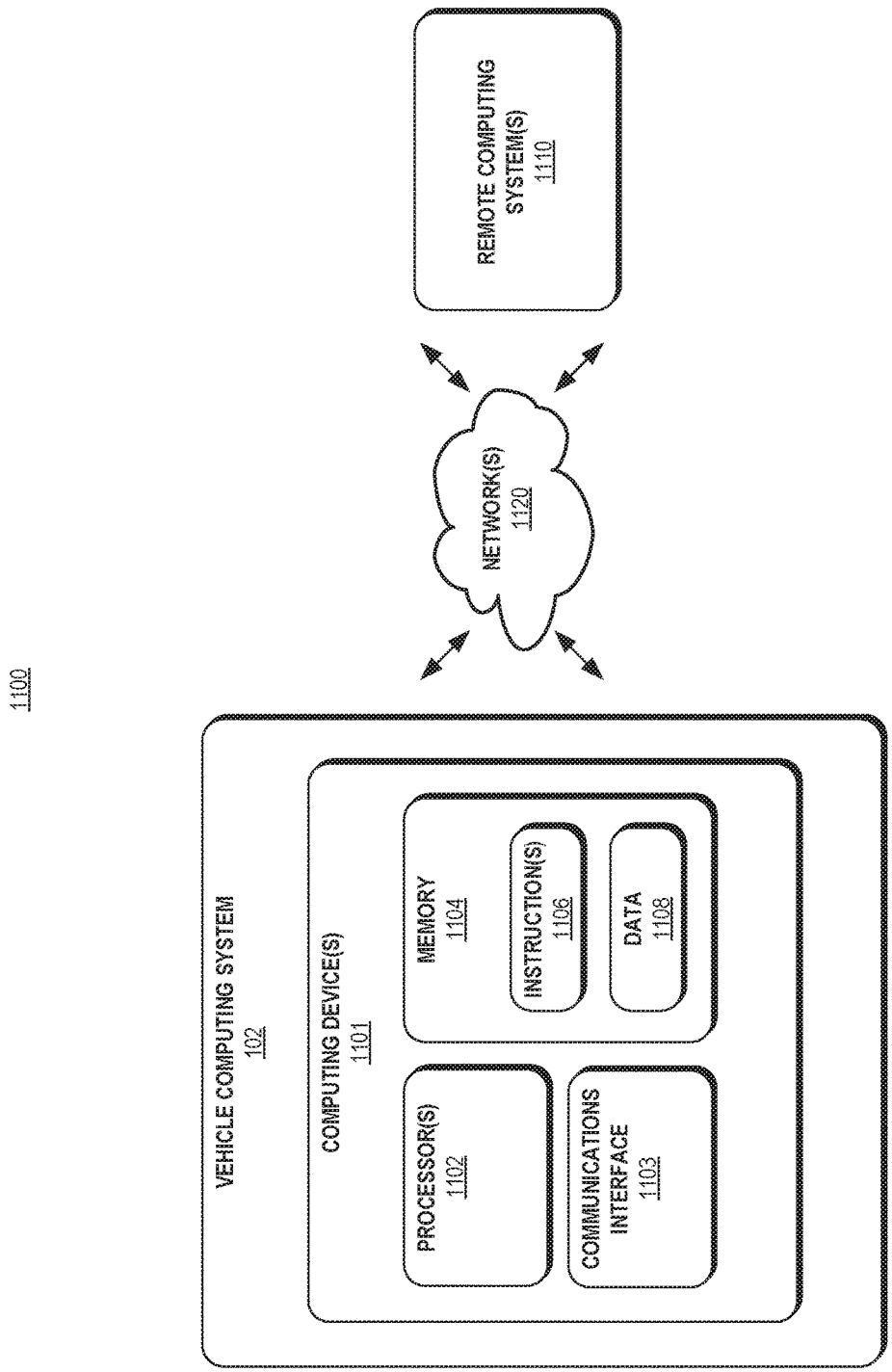

SYSTEMS AND METHODS FOR MANAGING SPACE AT A LOCATION FOR RECEIVING ASSETS

PRIORITY CLAIM

The present application claims the benefit of priority of U.S. Provisional Patent Application Nos. 62/662,996, 62/663,007, and 62/663,009 filed Apr. 26, 2018, entitled "Systems and Methods for Controlling Autonomous Vehicle," "Systems and Methods for Coordinating an Arrival of One or More Assets at a Location," and "Systems and Methods for Managing Space at a Location for Receiving Assets," respectively. The above-referenced patent applications are hereby incorporated by reference herein in their entirety for all purposes.

FIELD

The present disclosure relates generally to controlling or managing operations of autonomous vehicles when providing a vehicle-based service and, more particularly, to systems and methods for managing space at a location for receiving assets as part of providing a vehicle-based service.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of an environment proximate to the autonomous vehicle, the autonomous vehicle can identify an appropriate motion plan through such environment. One or more of such autonomous vehicles can be used to provide a vehicle-based service in which an autonomous vehicle(s) can autonomously navigate through an environment between a starting location and an ending location of the provided service.

SUMMARY

Aspects and advantages of the present disclosure will be set forth in part in the following description, or may be learned from the description, or may be learned through practice of the embodiments.

One example aspect of the present disclosure is directed to a computer-implemented method for monitoring an available capacity at a location to provide a vehicle-based service. The method includes identifying one or more assets that will arrive at a first location within a first transfer hub at an arrival time. The method includes sending data indicative of the one or more assets to a transportation network computing system associated with the first transfer hub. The method includes obtaining data indicative of an availability of free space at the first location for receiving the one or more assets at the arrival time. The method includes controlling the one or more assets based at least in part on the available capacity.

Another example aspect of the present disclosure is directed to a computer-implemented method for managing available capacity at a location for receiving an asset. The method includes obtaining data indicative of one or more first assets that will arrive at a first location within a first transfer hub at an arrival time, the one or more autonomous vehicles being associated with a first service provider. The method includes determining an available capacity at the first location within the first transfer hub for receiving the one or more first assets at the arrival time. The method includes moving one or more second assets positioned at the first location to a second location within the first transfer hub to increase the available capacity at the first location for receiving the one or more first assets at the arrival time.

Another example aspect of the present disclosure is directed to a computing system for monitoring an available capacity at a location to provide a vehicle-based service. The computing system includes one or more processors and one or more tangible, non-transitory, computer readable media that collectively store instructions that when executed by the one or more processors cause the computing system to perform operations. The operations include identifying one or more first assets scheduled to arrive at a first location within a first transfer hub at an arrival time. The operations include sending data indicative of the one or more first assets to a transportation network computing system associated with the first transfer hub. The operations include obtaining data indicative of an available capacity at the first location for receiving the one or more first assets at the arrival time. The operations include controlling the one or more first assets based at least in part on the available capacity.

Yet another example aspect of the present disclosure is directed to a computing system for managing available capacity at a location for receiving an asset. The computing system includes one or more processors and one or more tangible, non-transitory, computer readable media that collectively store instructions that when executed by the one or more processors cause the computing system to perform operations. The operations include obtaining data indicative of one or more first assets scheduled to arrive at a first location within a first transfer hub at an arrival time, the one or more autonomous vehicles being associated with a first service provider. The operations include determining an available capacity at the first location within the first transfer hub for receiving the one or more first assets at the arrival time. The operations include moving one or more second assets positioned at the first location to a second location within the first transfer hub to increase the available capacity at the first location for receiving the one or more first assets at the arrival time.

Other example aspects of the present disclosure are directed to systems, methods, vehicles, apparatuses, tangible, non-transitory computer-readable media, and memory devices for controlling or managing operations of autonomous vehicles when providing a vehicle-based service.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which:

FIG. 6 depicts an example of a cargo route in a transportation network according to example embodiments of the present disclosure;

FIG. 7 depicts an example transfer schedule associated with a transfer hub according to example embodiments of the present disclosure;

FIG. 11 depicts example system components according to example embodiments of the present disclosure.

Figure 1:
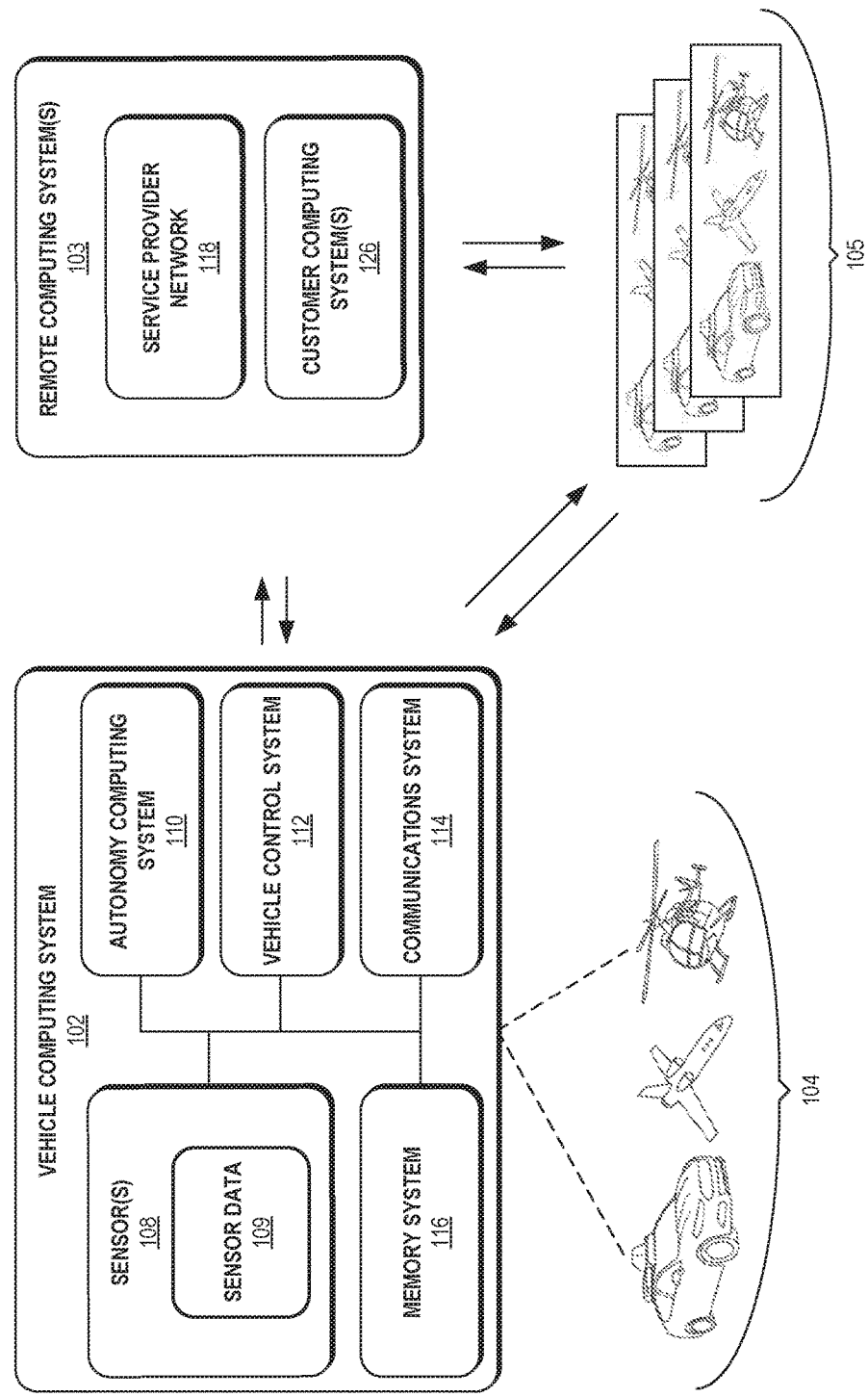
FIG. 1 depicts an example system overview according to example embodiments of the present disclosure.

Reference numerals that are repeated across plural figures are intended to identify the same components or features in various implementations.

DETAILED DESCRIPTION

Example aspects of the present disclosure are directed to managing (e.g., monitoring, estimating, and/or controlling) an available capacity at a location for receiving one or more assets (e.g., autonomous vehicle(s) and/or cargo). For instance, one or more entities (e.g., a service provider(s)) can operate a respective fleet of vehicles to transport cargo and provide a vehicle-based service (e.g., a transportation service) via a transportation network that includes a plurality of transfer hubs linked together via one or more transportation routes (e.g., highways, roads, etc.). At a given moment, a plurality of assets across the one or more respective fleets can be arriving at, departing from, or located in each of the transfer hubs, and each transfer hub should have available capacity for receiving vehicles that are arriving at the transfer hub. The one or more service providers can communicate with a computing system associated with the transportation network in order to operate each respective fleet on the transportation network. For example, the one or more service providers can operate as part of a service provider network. The one or more service providers can obtain information indicative of an available capacity at a first location associated with a transfer hub and/or request an allocation of capacity for one or more first assets at the first location via the service provider network. The one or more first assets can arrive at the first location at one or more first times, and the service provider network can direct one or more second assets to be moved from the first location to a second location associated with the transfer hub at one or more second times to increase the available capacity at the first location so that the transfer hub can receive the first asset(s) upon arrival. Systems and methods of the present disclosure enable monitoring, estimating, and managing an available capacity at one or more transfer hubs in the transportation network.

More particularly, a service provider can operate a fleet of one or more vehicles (e.g., ground-based vehicles) to provide a vehicle-based service, such as a transportation service, courier service, delivery service, or freight service. The vehicles can be autonomous vehicles that include various systems and devices configured to control the operation of the vehicle. For example, an autonomous vehicle can include an onboard vehicle computing system for operating the vehicle (e.g., located on or within the autonomous vehicle). In some implementations, the autonomous vehicles can operate in an autonomous mode. For example, the vehicle computing system can receive sensor data from sensors onboard the vehicle (e.g., cameras, LIDAR, RADAR), attempt to comprehend the environment proximate to the vehicle by performing various processing techniques on the sensor data, and generate an appropriate motion plan through the environment. In some implementations, the autonomous vehicles can operate in a manual mode. For example, a human operator (e.g., a driver) can manually control the autonomous vehicle. Moreover, the autonomous vehicle can be configured to communicate with one or more computing device(s) that are remote from the vehicle. As an example, the autonomous vehicle can communicate with an operations computing system that can be associated with the service provider. The operations computing system can help the service provider monitor, communicate with, manage, etc. the fleet of vehicles. As another example, the autonomous vehicle can communicate with one or more other vehicles (e.g., a vehicle computing system onboard each of the one or more other vehicles in the fleet), one or more other computing systems associated with the service provider network, and/or any other suitable remote computing system(s). In some implementations, the operations computing system can mediate communication between the autonomous vehicle and the computing device(s) that are remote from the vehicle.

According to aspects of the present disclosure, the service provider can provide a vehicle-based service via a transportation network. The transportation network can include a plurality of transfer hubs associated with various geographic locations, and a plurality of transportation routes connecting the transfer hubs. The service provider can control one or more autonomous vehicles in the fleet to transport cargo from a first location (e.g., a pick-up location) to a second location (e.g., a drop-off location) by using the transportation network.

As an example, a client can contract to transport cargo from a pick-up location to a drop-off location. A driver associated with the client can operate a vehicle to pick-up the cargo from the pick-up location, and transport the cargo to a first transfer hub that is proximate to the pick-up location. The service provider can control an autonomous vehicle in the fleet to autonomously transport the cargo to reach a second transfer hub that is proximate to the drop-off location (e.g., directly from the first transfer hub or via one or more other transfer hubs). If the vehicle operated by the driver associated with the client is an autonomous vehicle in the fleet, then the service provider can optionally control the same vehicle to autonomously transport the cargo. If the vehicle operated by the driver associated with the client is not in the fleet, then the service provider can direct the cargo to be transferred to an autonomous vehicle in the fleet at the first transfer hub. When the cargo arrives at the second transfer hub, another driver associated with the client can operate a vehicle to transport the cargo from the second transfer hub to the drop-off location.

As another example, the service provider can control an autonomous vehicle in the fleet to pick-up cargo at a pick-up location, and transport the cargo to a first transfer hub that is proximate to the pick-up location. The service provider can control an autonomous vehicle in the fleet to transport the cargo from the first transfer hub to a second transfer hub that is proximate to a drop-off location (e.g., directly from the first transfer hub or via one or more other transfer hubs). The service provider can control an autonomous vehicle in the fleet to transport the cargo from the second transfer hub to the drop-off location.

According to aspects of the present disclosure, a transfer hub can include or be associated with one or more landing zones (e.g., an arrival area(s)), one or more dropyards (e.g., a holding area(s)), and one or more launch zones (e.g., a departure area(s)). In particular, the landing zone(s) can be a location (e.g., proximate to an exit ramp of a highway road) for receiving one or more incoming assets, the dropyard(s) can be a location for holding one or more assets located at the transfer hub, and the launch zone(s) can be a location from which one or more assets can depart the transfer hub. The asset(s) can include an autonomous vehicle that is transporting cargo (e.g., an autonomous vehicle that is hitched to a trailer containing cargo), an autonomous vehicle that is not transporting cargo (e.g., an autonomous vehicle that is not hitched to a trailer containing cargo), or only cargo (e.g., a trailer containing cargo that is not hitched to an autonomous vehicle). In some implementations, the dropyard(s) can also be a location for receiving one or more vehicles transporting cargo from a pick-up location to the transfer hub, or for receiving one or more vehicles transporting cargo from the transfer hub to a drop-off location. The vehicle(s) transporting cargo between the transfer hub and a pick-up/drop-off location may or may not include an autonomous vehicle. The asset(s) can arrive at one of the landing zone(s) or one of the dropyard(s) at the transfer hub, and the service provider can direct the asset(s) to one or more locations associated with the dropyard (e.g., dropyard(s) and/or a landing zone). The service provider can direct the asset(s) to a landing zone at or before a departure time associated with the asset(s) so that the asset(s) can depart the transfer hub.

According to aspects of the present disclosure, a transfer hub in the transportation network can be associated with one or more human operators (e.g., jockeys) who can be directed by the service provider network to move one or more assets at the transfer hub from one location to another location within the transfer hub. The asset(s) can include, for example, an autonomous vehicle that is transporting cargo (e.g., an autonomous vehicle that is hitched to a trailer containing cargo), an autonomous vehicle that is not transporting cargo (e.g., an autonomous vehicle that is not hitched to a trailer containing cargo), or only cargo (e.g., a trailer containing cargo that is not hitched to a vehicle). For example, when an asset arrives at a first location associated with the transfer hub, the service provider network can assign a jockey from one or more jockeys associated with the transfer hub to move the asset from the first location to a second location associated with the transfer hub at a future time (e.g., at a time immediately after assigning the jockey, or at a later time), and direct the jockey to move the asset at such future time.

According to aspects of the present disclosure, the service provider can operate the fleet by grouping a plurality of autonomous vehicles in the fleet into one or more "convoy" units. The service provider can direct the vehicles in a convoy to be moved together as a group from a first location to a second location within a transfer hub, and/or control the vehicles in the convoy to depart the transfer hub and travel together as a group to a next destination.

In some implementations, a convoy can include a lead vehicle and one or more follower vehicles. The lead vehicle can be configured to operate ahead of the follower vehicle(s), and the follower vehicle(s) can be configured to follow behind the lead vehicle. The inter-vehicle distances of the convoy can vary in embodiments from close-following (less than a foot or several feet to create an aerodynamic effect that reduces aerodynamic drag for following vehicles) to farther distances (e.g., within visual range or within short-distance communication range).

In some implementations, the service provider can assign a human operator (e.g., an escort) to a convoy, so that the human operator can supervise, manage, and/or control autonomous vehicles in the convoy. As an example, the service provider can assign the vehicle that includes a human operator as a lead vehicle in a convoy. The human operator can monitor the operation of the lead vehicle, the follower vehicle(s), and/or the environment (e.g., traffic, road conditions, weather, etc.) for off nominal conditions. The operation of the lead vehicle can be autonomous or manual.

According to aspects of the present disclosure, the transportation network can be associated with a service provider network. The service provider can communicate (e.g., via the operations computing system) with the service provider network to provide and/or obtain information associated with the transportation network (e.g., an arrival or departure of one or more assets at or from a transfer hub, an available capacity at a location associated with a transfer hub, an allocation of capacity at a location associated with a transfer hub, etc.) for providing the vehicle-based service using the transportation network. More generally, one or more service providers can communicate (e.g., via a respective operations computing system) with the service provider network to operate a respective fleet of vehicles on the transportation network and/or provide a respective vehicle-based service using the transportation network.

In some implementations, a transfer hub in the transportation network can include or be associated with one or more cameras and/or sensors at one or more locations associated with the transfer hub. The cameras and/or sensors can be configured to provide audio/visual data and/or sensor data corresponding to a location associated with the transfer hub to the service provider network. The service provider network can determine an available capacity associated with the location based on the audio/visual and/or sensor data.

As an example, a landing zone associated with a first transfer hub can include one or more cameras. The service provider network can obtain audio/visual data from the camera(s) indicative of all or part of a physical space at the landing zone. The service provider network can analyze the data to determine a total capacity associated with the landing zone and identify one or more objects (e.g., vehicle(s), cargo, person(s), safety barrier(s), obstruction(s), etc.) that are occupying the physical space at the landing zone. Alternatively, the service provider network can obtain predetermined information indicative of the total capacity associated with the landing zone. The service provider network can determine an available capacity associated with the landing zone based on the total capacity and the object(s) that are occupying the landing zone.

As another example, a landing zone associated with a first transfer hub can include one or more sensors. The sensor(s) can be associated with one or more designated spaces within the landing zone for receiving an asset arriving at the landing zone. When an asset arrives at the landing zone and occupies one of the designated spaces, a corresponding sensor can indicate that the designated space is unavailable. When the asset is moved from the designated space to another location (e.g., dropyard or landing zone) associated with the first transfer hub, the corresponding sensor can indicate that the designated space is available. The sensor(s) can provide data indicative of an occupancy/availability of the one or more designated spaces within the landing zone to the service provider network, and the service provider network can determine/update an available capacity associated with the landing zone based on the sensor data.

As another example, a landing zone associated with a first transfer hub can include one or more cameras and/or sensors that are associated with one or more entry points and one or more exit points of the landing zone. The camera(s) and/or sensor(s) can provide audio/visual data and/or sensor data corresponding to the entry and exit point(s) to the service provider network. The service provider network can determine a number of asset(s) that have entered the landing zone based on the data corresponding to the entry point(s) and determine a number asset(s) that have exited the landing zone based on data corresponding to the exit point(s). The service provider network can determine an available capacity associated with the landing zone based on a difference between the number of asset(s) that have entered and exited the landing zone.

As another example, one or more locations associated with a first transfer hub (e.g., landing zone(s), dropyard(s), launch zone(s), etc.) can include one or more cameras and/or one or more sensors. The camera(s) and/or sensor(s) can be associated with one or more designated spaces within the location(s) and/or associated with one or more entry points and one or more exit points of the location(s).

In some implementations, the service provider network can estimate an available capacity at a location associated with a transfer hub at a future time.

As an example, one or more service providers can communicate (e.g., via a respective operations computing system) with the service provider network to provide data indicative of one or more assets arriving at a landing zone associated with a first transfer hub. The service provider network can communicate with the service provider(s) (e.g., with a respective operations computing system) and request the data indicative of the asset(s) arriving at the landing zone, and/or the service provider(s) can provide the data indicative of the asset(s) periodically or in response to a triggering event (e.g., when the service provider determines that an asset will arrive at the landing zone). In particular, each service provider can provide data associated with one or more assets that are managed by the service provider. The service provider network can estimate an available capacity at the landing zone at a future time based on the data indicative of the asset(s) arriving at the landing zone.

As another example, the service provider network can obtain data indicative of a transfer schedule associated with a landing zone. The transfer schedule can include one or more assignments to move one or more assets from the landing zone to another location (e.g., dropyard or landing zone) at one or more future times. The service provider network can estimate an available capacity at the landing zone at a future time based on the data indicative of the transfer schedule.

As another example, the service provider network can obtain data indicative of one or more assets arriving at a landing zone and data indicative of a transfer schedule associated with the landing zone. The service provider network can estimate an available capacity at the landing zone at a future time based on the asset(s) arriving at the landing zone and the transfer schedule at the landing zone.

In some implementations, the service provider (e.g., operations computing system) can communicate with the service provider network to obtain information associated with the transportation network (e.g., an available capacity at a location associated with a transfer hub).

As an example, the service provider can determine one or more first assets that are arriving at a landing zone associated with a first transfer hub. The service provider can communicate with the service provider network to obtain data indicative of an available capacity at the landing zone for receiving the first asset(s). The service provider network can determine the available capacity at the landing zone (e.g., based on data obtained from one or more cameras and/or sensors, data obtained from one or more service providers, and/or data indicate of a transfer schedule) and provide data indicative of the available capacity back to the service provider. The data indicative of the available capacity can include, for example, a determination by the service provider network of the available capacity, a live stream of audio/visual from one or more cameras associated with the landing zone, and/or sensor data from one or more sensors associated with the landing zone. If the service provider determines that the available capacity at the landing zone is insufficient to receive the first asset(s), then the service provider can, for example, control the first asset(s) to travel to a different transfer hub, or request an allocation of capacity for the first asset(s) at the landing zone.

As another example, the service provider can determine one or more first assets that are arriving at a landing zone associated with a first transfer hub at a future time. The service provider can communicate with the service provider network to obtain data indicative of an available capacity at the landing zone for receiving the first asset(s) at the future time. The service provider network can determine the available capacity at the landing zone at the future time (e.g., based on data obtained from one or more cameras and/or sensors, data obtained from one or more service providers, and/or data indicate of a transfer schedule) and provide data indicative of the available capacity to the service provider. The data indicative of the available capacity can include, for example, a determination by the service provider network of the available capacity at the future time. If the service provider determines that the available capacity at the landing zone is insufficient to receive the first asset(s) at the future time, then the service provider can, for example, control an arrival time of the first asset(s) at the landing zone (e.g., expedite or delay the arrival time with respect to the future time), control the first asset(s) to travel to a different transfer hub, or request an allocation of capacity for the first asset(s) at the landing zone.

In some implementations, the service provider (e.g., via the operations computing system) can communicate with the service provider network to request an allocation of capacity at a transfer hub for receiving one or more assets.

As an example, the service provider can determine one or more first assets that are arriving at a landing zone associated with a first transfer hub at a current/future time. The service provider can communicate with the service provider network to request an allocation of capacity for the first asset(s) at the current/future time. In response, the service provider network can decrease an available capacity associated with the landing zone at the current/future time commensurate with the first asset(s) so that the allocated capacity is unavailable at the current/future time for one or more other assets being managed by the service provider or another service provider. Additionally, if an available capacity associated with the landing zone at the current/future time is insufficient for receiving the first asset(s), then the service provider network can direct/schedule one or more second asset(s) to be moved from the landing zone to another location (e.g., dropyard or launch zone) associated with the first transfer hub at the current time or before the future time in order to increase the available capacity at the landing zone at the future time.

The systems and methods described herein may provide a number of technical effects and benefits. For instance, by monitoring and estimating an available capacity at a location associated with a transfer hub, one or more service providers can each obtain data indicative of the available capacity. In this way, the present disclosure enables the service provider(s) to more efficiently manage and control a respective fleet to provide a respective vehicle-based service. In particular, the service provider(s) can minimize a delay or wait time for one or more assets arriving at the transfer hub. Additionally, by managing an available capacity at the location in response to information provided by the service provider(s) and/or an allocation of capacity requested by the service provider(s), the present disclosure enables improved utilization of the transfer hub.

The systems and methods described herein may also provide resulting improvements to computing technology tasked with providing a vehicle-based service and/or managing a fleet of vehicles to provide a vehicle-based service. For example, the systems and methods described herein may provide improvements in a utilization of the fleet of vehicles for providing the vehicle-based service, resulting in greater throughput and reduced energy expenditure by reducing a likelihood of an asset to wait for available capacity when arriving at a transfer hub.

Figure 2:
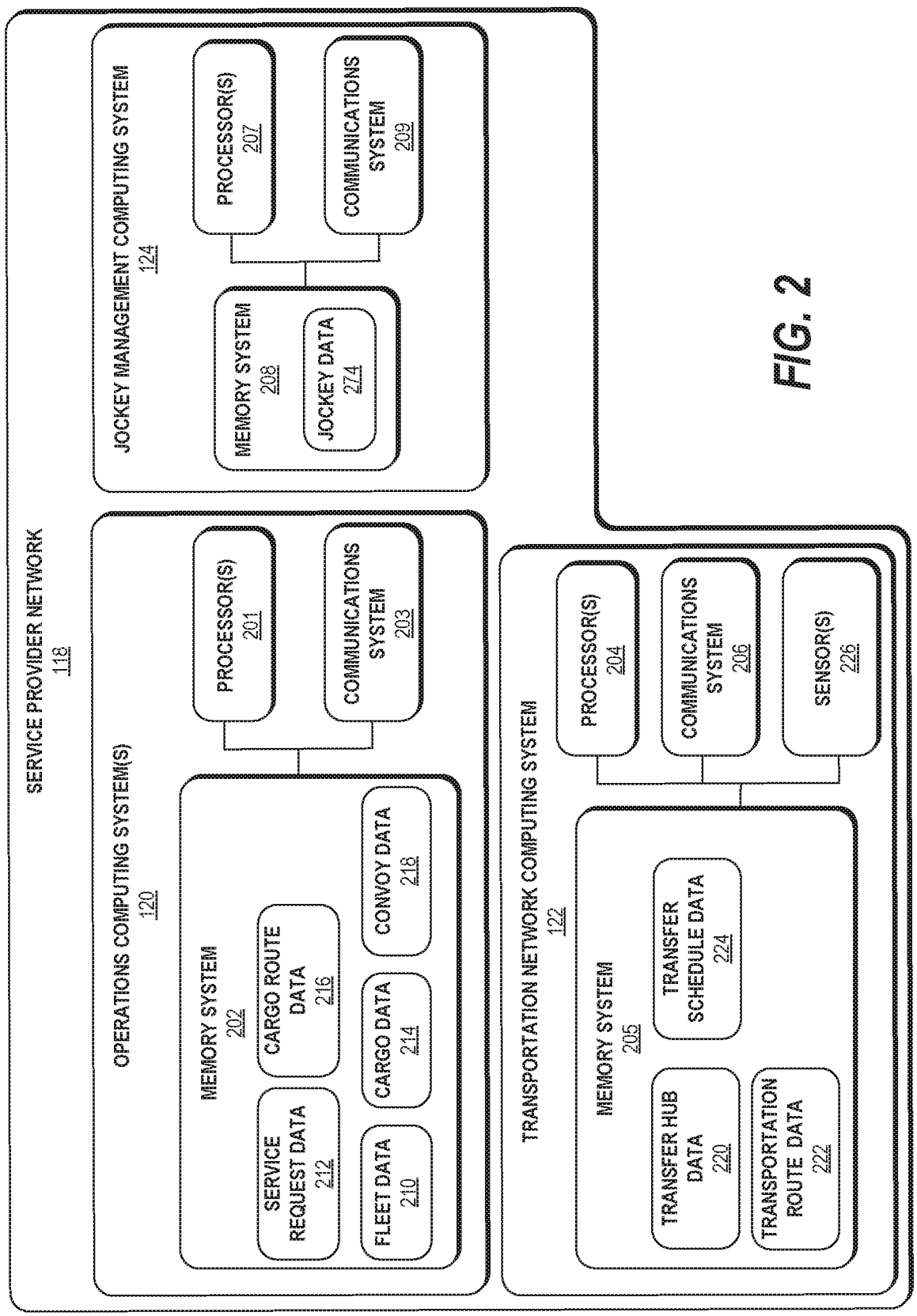
FIG. 2 depicts an example remote computing system(s) according to example embodiments of the present disclosure.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104 and one or more remote computing systems 103. The system 100 can also include one or more additional vehicles 105, each including a respective vehicle computing system (not shown). In one embodiment, the remote computing system(s) 103 may include or be associated with a service provider network 118 and one or more client computing systems 126. As shown in FIG. 2, the service provider network 118 may include or be associated with one or more operations computing systems 120 that allow one or more respective service providers to provide a vehicle-based service, such as one or more of the example vehicle-based services described herein.

In some implementations, the vehicle computing system 102, the remote computing system(s) 103 (e.g., the service provider network 118 and the client computing system(s) 126), and vehicle(s) 105 (e.g., vehicle computing system associated with each of the vehicle(s) 105) can be remote from each other and communicate with each other remotely.

In some implementations, the vehicle 104 can be part of a fleet of vehicles managed by an operations computing system 120. Additionally, the vehicle(s) 105 can be part of the fleet of vehicles managed by the operations computing system 120.

In one embodiment, the operations computing system 120 can manage the vehicle 104 via the vehicle computing system 102. Additionally, the operations computing system 120 can manage the vehicle(s) 105 via a respective vehicle computing system associated with each of the vehicle(s) 105. The operations computing system 120 can obtain data indicative of a service request from a client, for example, via a client computing system 126 associated with the client. The operations computing system 120 can select the vehicle 104 to provide the vehicle service requested by the client. The operations computing system 120 can provide the vehicle computing system 102 with data indicative of cargo designated for autonomous transport, and control the vehicle 104 to provide the vehicle-based service.

The vehicle 104 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., boat, ship, or other watercraft). The vehicle 104 can be an autonomous vehicle that can drive, navigate, operate, etc. with minimal and/or no interaction from a human driver.

The vehicle 104 can include one or more sensors 108 that can acquire sensor data 109 indicative of one or more objects proximate to the vehicle 104, and/or indicative of one or more conditions. The objects can include, for example, pedestrians, vehicles, bicycles, attached cargo, and/or other objects. The conditions can include, for example, whether a trailer including cargo is hitched to the vehicle 104, whether a human operator is present in the vehicle 104, whether one or more diagnostic checks are successfully completed, a geographic location of the vehicle 104, and/or other conditions.

The vehicle 104 can include an autonomy computing system 110 that can obtain the sensor data 109 from the sensors, attempt to comprehend the surrounding environment by performing various processing techniques on the sensor data 109 (and/or other data), and generate an appropriate motion plan through such surrounding environment.

FIG. 2 illustrates a schematic view of one embodiment of the service provider network 118 described above with reference to FIG. 1. As indicated above, the service provider network 118 may generally include or be associated with one or more computing systems that allow one or more operations computing systems 120 to provide a vehicle-based service. For instance, as shown in FIG. 2, the service provider network 118 may, in one embodiment, include the operations computing system(s) 120, a transportation network computing system 122, a jockey management computing system 124, and/or any combination of such computing systems. It should be appreciated that, although the computing systems 120, 122, 124 will generally be described separately, the various functions and/or other tasks described herein as being implemented by any of such computing systems forming part of the service provider network 118 may, instead, by performed by a single computing system of the service provider network or may be distributed across two or more computing systems of the service provider network 118.

As shown in FIG. 2, the transportation network computing system 122 associated with the service provider network 118 can include one or more processors 204, memory system 205, communications system 206, and sensor(s) 226. The memory system 205 can include transfer hub data 220, transportation route data 222, and transfer schedule 224 associated with a transportation network that is used to provide a vehicle-based service. The operations computing system(s) 120 can communicate with the transportation network computing system 122 to obtain data indicative of the transportation network in order to provide the vehicle-based service.

The sensor(s) 226 can include one or more cameras and/or other sensors associated with the transportation network. The camera(s) and/or sensor(s) can be associated with one or more locations associated with one or more transfer hubs in the transportation network. The transportation network computing system 122 can acquire sensor data (e.g., audio/visual data, occupancy/availability data, etc.) from the sensor(s) 226, and store the sensor data in the transfer hub data 220.

The transfer hub data 220 can include information about one or more transfer hubs in the transportation network and one or more attributes associated with each transfer hub. The attribute(s) associated with each transfer hub can include, for example, a transfer hub identifier associated with the transfer hub and a plurality of locations associated with the transfer hub (e.g., landing zone(s), dropyard(s), launch zone(s)). Additionally, the transfer hub data 220 can include information about one or more attributes associated with each of the plurality of locations. The attribute(s) associated with each location can include, for example, a total capacity, available capacity, capacity threshold, geographic coordinates, and other characteristics or facilities associated with the location.

The total capacity associated with a location can correspond to a maximum number of asset(s) that can be located at the location at a single time. The total capacity can be based on a physical space corresponding to the location and a physical space used by each asset. The total capacity can also be based on, for example, a minimum distance to keep between the asset(s) at the location, safety barriers, obstructions, or other objects occupying the location. The transportation network computing system 122 can obtain predetermined information associated with the total capacity at the location, and/or can determine the total capacity based on sensor data acquired from the sensor(s) 226.

The available capacity associated with a location at a particular time can correspond to a difference between a total capacity associated with the location and an amount of the total capacity being used at the particular time. The available capacity associated with the location can vary during a particular duration of time based on a number of assets arriving at the location and a number of assets departing the location within the duration. When the service provider network 118 directs an asset to be moved to the location or directs an asset to be moved away from the location, the service provider network 118 can provide information about the move to the transportation network computing system 122. The transportation network computing system 122 can update the available capacity associated with the location based on the provided information. The transportation network computing system 122 can also determine the available capacity at the location based on sensor data acquired from the sensor(s) 226.

The capacity threshold associated with a location can be used to determine when to move one or more assets from the location to another location. The capacity threshold can be equal to or less than the total capacity associated with the location. For example, the service provider network 118 can direct a jockey to move one or more assets from a landing zone within a transfer hub to one or more other locations within the transfer hub when an amount of the total capacity being used at the landing zone reaches the capacity threshold.

The geographic coordinates associated with a location can be used to determine a distance from the location to one or more other locations (e.g., by comparing the geographic coordinates of the location and the other location(s)). For example, the service provider network 118 can determine a distance between a first location within the transfer hub (e.g., landing zone, dropyard, or launch zone) and a second location within the transfer hub (e.g., landing zone, dropyard, or launch zone), between the first location and a location associated with an asset, and/or between the first location and a location associated with a jockey.

The other characteristics or facilities associated with each location can indicate, for example, whether the location is associated with being capable of holding specific cargo-types (e.g., hazardous cargo, climate-controlled cargo, etc.), and/or whether the location is associated with being capable of performing one or more maintenance/repair services (e.g., refueling service, component repair/replacement service, component update/upgrade service, etc.).

As an example, a transfer hub can include a dropyard associated with being capable of holding an asset that includes hazardous cargo. The dropyard can include characteristics or facilities specifically tailored to hold an autonomous vehicle transporting a hazardous cargo and/or the hazardous cargo itself (e.g., an isolated location, special safety equipment, etc.). Based on a determination that an autonomous vehicle transporting hazardous cargo is at a landing zone, or will be arriving at the landing zone, the service provider network 118 can assign a jockey to move the asset from the landing zone to the dropyard associated with being capable of holding hazardous cargo. In example embodiments, the service provider network 118 can select the dropyard dynamically and/or automatically based on the determination that the asset includes hazardous cargo.

As another example, a transfer hub can include a dropyard associated with being capable of holding an asset that includes climate-controlled cargo. The dropyard can include characteristics or facilities specifically tailored to hold an autonomous vehicle transporting a climate-controlled cargo and/or the climate-controlled cargo itself (e.g., climate-controlled holding area, etc.). Based on a determination that an autonomous vehicle transporting climate-controlled cargo is at a landing zone, or will be arriving at the landing zone, the service provider network 118 can assign a jockey to move the asset from the landing zone to the dropyard associated with being capable of holding climate-controlled cargo. In example embodiments, the service provider network 118 can select the dropyard dynamically and/or automatically based on the determination that the autonomous vehicle includes climate-controlled cargo.

As another example, a transfer hub can include a dropyard associated with being capable of performing one or more maintenance/repair services. The dropyard can include characteristics or facilities specifically tailored for performing the maintenance/repair service(s) (e.g., tools, inventory, technicians, etc.). Based on a determination that an asset includes an autonomous vehicle that is in need of one or more maintenance/repair services and that the autonomous vehicle is at a landing zone, or will be arriving at the landing zone, the service provider network 118 can assign a jockey to move the asset from the landing zone to the dropyard associated with being capable of performing the maintenance/repair service(s). In example embodiments, the service provider network 118 can select the dropyard dynamically and/or automatically based on the determination that the autonomous vehicle is in need of the maintenance/repair service(s).

Referring still to FIG. 2, the transportation route data 222 can include information about one or more transportation routes connecting the transfer hub(s) in the transportation network and one or more attributes associated with each transportation route. The one or more attributes associated with each transportation route can include, for example, a route distance, average speed limit, traffic conditions, road conditions, weather conditions, etc.

The transfer schedule 224 can include information associated with each transfer hub in the transportation network. The transfer schedule 224 can include a schedule of one or more assignments for moving one or more assets from a first location (e.g., landing zone or dropyard) associated with a transfer hub to a second location (e.g., dropyard or launch zone) associated with the transfer hub. The service provider network 118 can schedule an assignment based on one or more attributes associated with the asset(s) and/or an availability of a jockey for each assignment, and the service provider network 118 an store the assignment in the transfer schedule 224. If the asset(s) includes cargo, then the attributes associated with the asset(s) can include, for example, a cargo-type, scheduled arrival time, and/or scheduled departure time associated with the cargo. If the asset(s) includes an autonomous vehicle, then the attributes associated with the asset(s) can also include, for example, an estimated arrival time associated with the autonomous vehicle. FIG. 7 depicts an example of a transfer schedule according to example embodiments of the present disclosure, and is discussed further below.

Referring still to FIG. 2, the jockey management computing system 124 of the service provider network 118 can include one or more processors 207, a memory system 208, and a communications system 209. The memory system 208 can, for instance, include jockey data 274.

The jockey data 274 can include information about one or more attributes associated with each jockey in a pool of jockeys associated with each transfer hub in the transportation network. The operations computing system 120 can communicate with the jockey management computing system 124 to obtain data indicative of the jockey(s) in order to assign a jockey to move one or more asset(s) within a transfer hub. The jockey data 274 can include, for example, a jockey identifier, transfer hub, an assignment log, a jockey location, a travel distance, a travel mode, a travel time, shift information, one or more licenses, a performance rating, and/or an assignment confirmation. The jockey management computing system 124 can communicate with one or more computing systems associated with one or more jockeys (e.g., a mobile phone associated with the jockey).

The jockey identifier associated with each jockey can indicate a unique identifier for the jockey. For example, the jockey identifier may correspond to a unique number, code, and/or other identifying information and/or data.

The transfer hub associated with each jockey can indicate a transfer hub associated with the jockey. The jockey can be assigned to move one or more asset(s) between locations associated the transfer hub.

The assignment log associated with each jockey can indicate one or more assignments that are assigned to the jockey. In one embodiment, the assignment log can indicate one or more assignments that were assigned to the jockey and completed, and/or one or more assignments that are assigned to the jockey and are currently pending (e.g., one or more assignments that are to be completed at a current time and/or one or more future times). Each assignment in the assignment log can include, for instance, an identifier corresponding to an asset(s) to be moved, a first location from which the asset(s) is to be moved, a second location to which the asset(s) is to be moved, a scheduled time when the asset(s) is to be moved from the first location to the second location, and/or an estimated duration. The estimated duration can indicate an estimated amount of time for moving the asset(s) from the first location to the second location.

The jockey location associated with each jockey can indicate a location of the jockey at a current time and/or a future time. As an example, if a jockey is disposed at a first location within a transfer hub at a current time, then a jockey location associated with the jockey at the current time can indicate the first location. If the jockey will be disposed or is expected to be disposed at a second location within the transfer hub at a future time, then a jockey location associated with the jockey at the future time can indicate the second location.

The travel distance associated with each jockey can indicate a distance that the jockey will travel to arrive at a location of an asset associated with an assignment. As a first example, if a jockey is at a first location and the service provider network assigns the jockey a first assignment to move an asset from the first location to a second location, then a travel distance associated with the jockey for the first assignment can indicate a negligible distance because the jockey is already at the first location. As a second example, if a jockey is at a first location and the service provider network assigns the jockey a first assignment to move an asset from a second location to a third location, then a travel distance associated with the jockey for the first assignment can indicate a distance between the first location and the second location. As a third example, if a jockey is at a first location and the service provider network assigns the jockey a first assignment to move an asset from the first location to a second location and a second assignment to move an asset from the second location to a third location, then a travel distance associated with the jockey for the first assignment can indicate a negligible distance because the jockey is already at the first location and the travel distance associated with the jockey for the second assignment can indicate a negligible distance because the jockey will already be at the second location after completing the first assignment. As a fourth example, if a jockey is at a first location and the service provider network assigns the jockey a first assignment to move an asset from the first location to a second location and a second assignment to move an asset from a third location to a fourth location, then a travel distance associated with the jockey for the first assignment can indicate a negligible distance because the jockey is already at the first location and a travel distance associated with the jockey for the second assignment can indicate a distance between the second location and the third location.

The travel mode associated with each jockey can indicate one or more modes of travel that the jockey can use to arrive at a location of an asset associated with an assignment. A mode of travel can include, for example, a walking mode, a support vehicle mode, or other mode. As an example, the service provider network can assign a jockey a first assignment to move an asset from a first location to a second location. If the jockey can arrive at the first location by walking to the first location, then a travel mode associated with the jockey for the first assignment can indicate a walking mode. If the jockey can arrive at the first location by operating a support vehicle, then a travel mode associated with the jockey for the first assignment can indicate a support vehicle mode. If the jockey can arrive at the first location by another mode, then a travel mode associated with the jockey for the first assignment can indicate such other mode.

The travel time associated with each jockey can indicate an amount of time for the jockey to arrive at a location of an asset associated with an assignment. As a first example, if a jockey is at a first location and the service provider network assigns the jockey a first assignment to move an asset from the first location to a second location, then a travel time associated with the jockey for the first assignment can indicate a negligible amount of time because the jockey is already at the first location. As a second example, if a jockey is at a first location and the service provider network assigns the jockey a first assignment to move an asset from a second location to a third location, then a travel time associated with the jockey for the first assignment can indicate an amount of time for the jockey to travel from the first location to the second location. As a third example, if a jockey is at a first location and the service provider network assigns the jockey a first assignment to move an asset from the first location to a second location and a second assignment to move an asset from the second location to a third location, then a travel time associated with the jockey for the first assignment can indicate a negligible amount of time because the jockey is already at the first location and the travel time associated with the jockey for the second assignment can indicate a negligible amount of time because the jockey will already be at the second location after completing the first assignment. As a fourth example, if a jockey is at a first location and the service provider network assigns the jockey a first assignment to move an asset from the first location to a second location and a second assignment to move an asset from a third location to a fourth location, then a travel time associated with the jockey for the first assignment can indicate a negligible amount of time because the jockey is already at the first location and a travel time associated with the jockey for the second assignment can indicate an amount of time for the jockey to travel from the second location to the third location. It should be appreciated that the travel time associated with a given assignment may vary, for example, based on the corresponding travel mode of the jockey (e.g., walking vs. driving).

The shift information associated with each jockey can indicate one or more shift start times and one or more shift end times during which the jockey is available to work. A shift start time associated with the jockey can indicate a time when the jockey becomes available for an assignment. A shift end time associated with the jockey can indicate a time when the jockey becomes unavailable for an assignment.

The license(s) associated with each jockey can indicate whether the jockey is qualified for an assignment. For example, a jockey can be required to obtain one or more licenses to manually operate a vehicle, remotely operate a vehicle, operate a commercial vehicle, operate a vehicle transporting certain types of cargo (e.g., hazardous materials and other hazardous cargo), etc.

The performance rating associated with each jockey can indicate an aggregate rating associated with the jockey based on a performance of the jockey with respect to one or more completed assignments.

The assignment confirmation associated with each jockey can indicate whether the jockey has confirmed acceptance of an assignment. For example, the service provider network can send a jockey an assignment request associated with a new assignment. The assignment request can include an identifier corresponding to an asset(s) to be moved, a first location from which the asset(s) is to be moved, a second location to which the asset(s) is to be moved, a scheduled time at which the asset(s) is to be moved, an estimated duration, and/or the like. The jockey can accept the new assignment by confirming the assignment request.

Referring still to FIG. 2, the one or more operations computing systems 120 can each include one or more processors 201, memory system 202, and communications system 203. The memory system 202 can include fleet data 210, service request data 212, cargo data 214, cargo route data 216, and convoy data 218.

The fleet data 210 can include information associated with a fleet of vehicles managed by the operations computing system(s) 120. For example, the fleet data 210 can include a unique identifier for the vehicle(s) 104, 105.

The service request data 212 can include information associated with one or more service requests from a client. For example, a client computing system 126 associated with the client can send data indicative of a service request to an operations computing system 120 for transporting cargo from a first location (e.g., pick-up location) to a second location (e.g., drop-off location). The data indicative of the service request can include the first location, the second location, and information associated with the cargo. The information associated with the cargo can include, for example, a cargo identifier, cargo-type, cargo weight, etc. The operations computing system 120 can store the data indicative of the service request in the service request data 212.

The cargo data 214 can include information associated with cargo designated for autonomous transport. For example, an operations computing system 120 can receive a service request from a client computing system 126 for transporting cargo. The operations computing system 120 can designate the cargo associated with the service request for autonomous transport, and store information associated with the designated cargo in the cargo data 214. The cargo data 214 can include, for example, a cargo identifier, cargo-type, cargo-weight, and/or other information associated with the cargo. The cargo identifier in the cargo data 214 can be based on a cargo identifier obtained from the client computing system 126 as part of a service request, or the operations computing system 120 can assign its own cargo identifier to the cargo in the cargo data 214.

The cargo route data 216 can include information associated with a cargo route for each cargo in the cargo data 214. An operations computing system 120 can determine a cargo route for a cargo based on a service request associated with the cargo in the service request data 212, transfer hub data 220, and transportation route data 222. For example, the operations computing system 120 can determine a first transfer hub in the transportation network that is proximate to the first location associated with the cargo (e.g., pick-up location), a second transfer hub that is proximate to the second location associated with the cargo (e.g., drop-off location), and one or more transportation routes that connect the first transfer hub to the second transfer hub. The operations computing system 120 can also determine the cargo route to include one or more transfer hubs between the first and second transfer hub and one or more transportation routes that connect the first transfer hub to the second transfer hub via the transfer hub(s) between the first and second transfer hub. The operations computing system 120 can also determine a scheduled arrival time and a scheduled departure time for the cargo at each of the transfer hubs in the cargo route. The operations computing system 120 can store the determined cargo route in the cargo route data 216.

The convoy data 218 can include information associated with one or more convoys that include one or more vehicles from the fleet of vehicles managed by the operations computing system(s) 120. The convoy data 218 can include, for example, a convoy identifier associated with each convoy, a vehicle identifier associated with a lead vehicle in the convoy, a vehicle identifier associated with each follower vehicle in the convoy, and an escort identifier associated with an escort assigned to the convoy. An operations computing system 120 can group one or more vehicles from the fleet of vehicles to create a new convoy, and the operations computing system 120 can store information associated with the new convoy in the convoy data 218.

Figure 3:
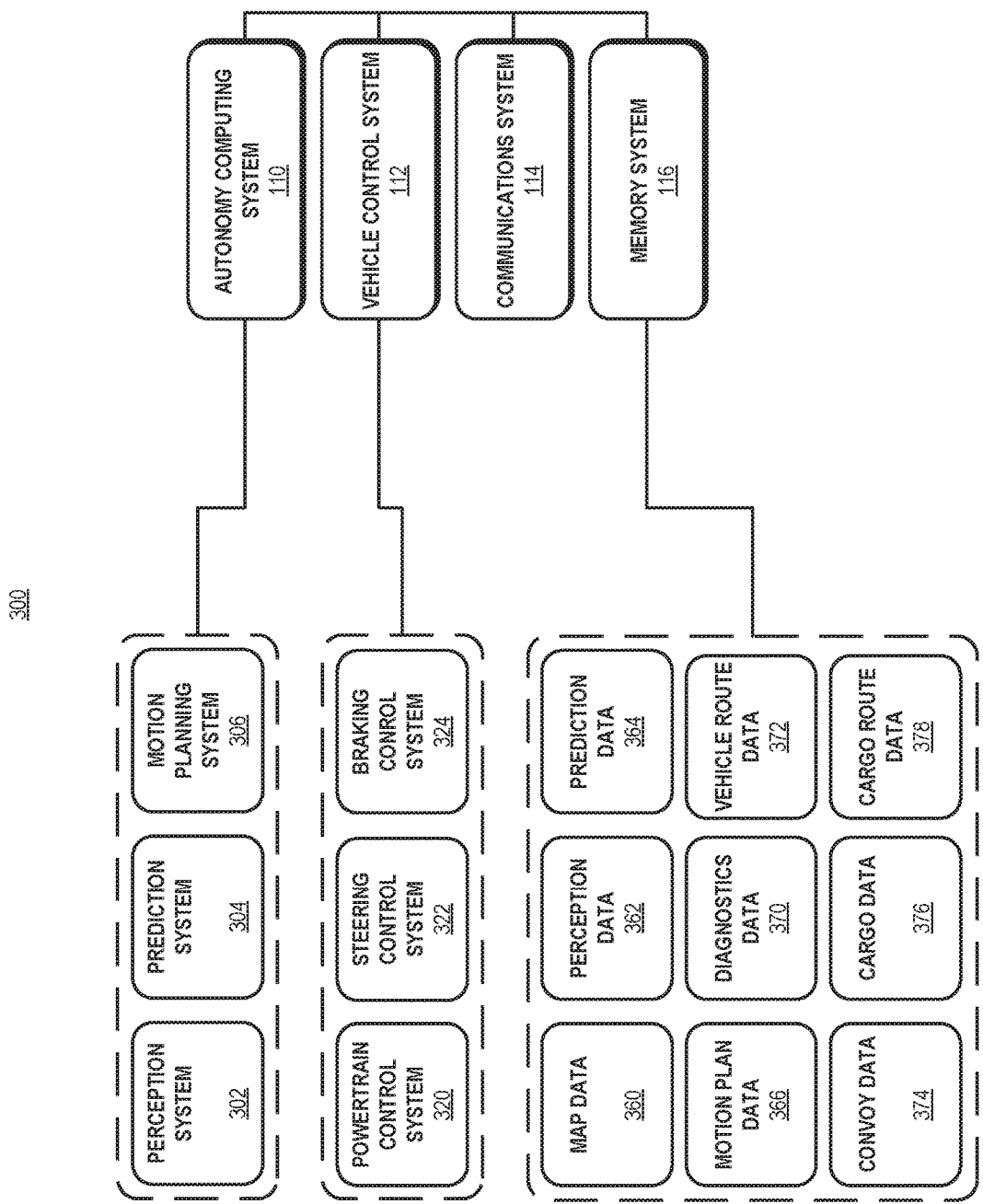
FIG. 3 depicts an example vehicle computing system according to example embodiments of the present disclosure.

Referring now to FIG. 3, a schematic view of one embodiment of the vehicle computing system 102 described above is illustrated in accordance with aspects of the present subject matter. As shown in FIG. 3, the autonomy computing system 110 can include a perception system 302, a prediction system 304, a motion planning system 306, and/or other systems that cooperate to perceive the surrounding environment of the vehicle 104 and determine a motion plan for controlling the motion of the vehicle 104 accordingly. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. The autonomy computing system 110 can control the one or more vehicle control systems 112 to operate the vehicle 104 according to the motion plan.

The autonomy computing system 110 can identify one or more objects that are proximate to the vehicle 104 based at least in part on the sensor data 109 and/or the map data 360. For instance, the perception system 302 can perform various processing techniques on the sensor data 109 to determine perception data 362 that is descriptive of a current state of one or more object(s) that are proximate to the vehicle 104. The prediction system 304 can create prediction data 364 associated with each of the respective one or more object(s) proximate to the vehicle 104. The prediction data 364 can be indicative of one or more predicted future locations of each respective object. The motion planning system 306 can determine a motion plan for the vehicle 104 based at least in part on the prediction data 364 (and/or other data), and save the motion plan as motion plan data 366. The motion plan data 366 can include vehicle actions with respect to the object(s) proximate to the vehicle 104 as well as the predicted movements. The motion plan data 366 can include a planned trajectory, speed, acceleration, etc. of the vehicle 104.

The motion planning system 306 can provide at least a portion of the motion plan data 366 that indicates one or more vehicle actions, a planned trajectory, and/or other operating parameters to the vehicle control system 112 to implement the motion plan for the vehicle 104. For instance, the vehicle 104 can include a mobility controller configured to translate the motion plan data 366 into instructions. By way of example, the mobility controller can translate the motion plan data 366 into instructions to adjust the steering of the vehicle 104 "X" degrees, apply a certain magnitude of braking force, etc. The mobility controller can send one or more control signals to the responsible vehicle control sub-system (e.g., powertrain control system 320, steering control system 322, braking control system 324) to execute the instructions and implement the motion plan.

The communications system 114 can allow the vehicle computing system 102 (and its computing system(s)) to communicate with one or more other computing systems (e.g., remote computing system(s) 103, vehicle(s) 105). The vehicle computing system 102 can use the communications system 114 to communicate with the service provider network 118 (including, for example, an operations computing system 120 that manages the vehicle 104, the transportation network computing system 122, and/or the jockey management computing system 124) and/or any other suitable remote computing system(s) (e.g., client computing system 126) over one or more networks (e.g., via one or more wireless signal connections). In some implementations, the communications system 114 can allow communication among one or more of the system(s) on-board the vehicle 104. The communications system 114 can include any suitable sub-systems for interfacing with one or more networks, including, for example, transmitters, receivers, ports, controllers, antennas, and/or other suitable sub-systems that can help facilitate communication.

The memory system 116 of the vehicle 104 can include one or more memory devices located at the same or different locations (e.g., on-board the vehicle 104, distributed throughout the vehicle 104, off-board the vehicle 104, etc.). The vehicle computing system 102 can use the memory system 116 to store and retrieve data/information. For instance, the memory system 116 can store map data 360, perception data 362, prediction data 364, motion plan data 366, diagnostics data 370, vehicle route data 372, convoy data 374, cargo data 376, and cargo route data 378.

The map data 360 can include information regarding: an identity and location of different roadways, road segments, buildings, or other items or objects (e.g., lampposts, crosswalks, curbing, etc.); a location and direction of traffic lanes (e.g., the location and direction of a parking lane, a turning lane, a bicycle lane, or other lanes within a particular roadway or other travel way and/or one or more boundary markings associated therewith); and/or any other data that assists the vehicle computing system 102 in comprehending and perceiving its surrounding environment and its relationship thereto.

The diagnostics data 370 can include diagnostics information generated by the vehicle computing system 102. The diagnostics information can correspond to one or more systems on-board the vehicle 104 and/or an environment in which the vehicle 104 operates. The diagnostics information can include raw sensor data associated with the one or more systems on-board the vehicle 104 and/or the environment in which the vehicle 104 operates. The vehicle computing system 102 (or remote computing system(s) 103) can use the diagnostics information to determine an operational status associated with the vehicle 104. The vehicle computing system 102 can optionally store the determined operational status with the diagnostics data 370.

As an example, the diagnostics information can include a fuel level below a threshold value. Based on the diagnostics information, the vehicle computing system 102 can determine an operational status of the vehicle as in need of a refueling service.

As another example, the diagnostics information can include an amount of wear/fatigue associated with one or more components on-board the vehicle 104. Based on the diagnostics information, the vehicle computing system 102 can determine an operational status of the vehicle 104 as in need of a component repair/replacement service.

As another example, the vehicle computing system 102 can determine an operational status of the vehicle 104 as in need of a diagnostics check service for a human operator (e.g., mechanic, technician, etc.) to check the diagnostics information.

The cargo data 376 can include information associated with cargo being transported by the vehicle 104. The cargo data 376 can indicate whether a trailer containing cargo is hitched to the vehicle 104. The trailer can include a plurality of cargo, and the cargo data 376 can include information associated with each cargo included in the trailer. The information associated with each cargo can include, for example, a cargo identifier, cargo-type, cargo-weight, and/or other information associated with the cargo. The vehicle computing system 102 can obtain the cargo data 376 from the operations computing system 120 based on the cargo data 214.

The cargo route data 378 can include information associated with a cargo route for each cargo in the cargo data 376. The cargo data 376 can include, for example, a first location (e.g., pick-up location), a second location (e.g., drop-off location), a plurality of transfer hubs in the transportation network, and a plurality of transportation routes connecting the first location to the second location via the plurality of transfer hubs. The vehicle computing system 102 can obtain the cargo route data 378 from the operations computing system 120 based on the cargo route data 216. FIG. 6 depicts an example of a cargo route according to example embodiments of the present disclosure, and is discussed further below.

The vehicle route data 372 can include information associated with a vehicle route for the vehicle 104. The vehicle route data 372 can include a vehicle location, a current destination, and one or more transportation routes connecting the vehicle location to the current destination. The vehicle location can indicate a geographic location of the vehicle 104 at a current time. If the vehicle 104 is transporting cargo, then the current destination and the transportation route(s) connecting the vehicle location to the current destination can be based on the cargo route data 378. For example, if the cargo route includes a first transfer hub followed by a second transfer hub and the vehicle computing system 102 determines that the vehicle 104 has departed the first transfer hub, then the vehicle computing system 102 can determine that the current destination is the second transfer hub.

The vehicle route data 372 can also include, for example, a vehicle speed, an estimated arrival time, and a next destination.

The vehicle speed can indicate a current speed of the vehicle 104. The vehicle computing system 102 can determine the travel speed based on, for example, a speed sensor onboard the vehicle 104.

The estimated arrival time can indicate an amount of time for the vehicle 104 to reach the current destination. The vehicle computing system 102 can determine the estimated arrival time based on the vehicle location and vehicle speed in the vehicle route data 372. The vehicle computing system 102 can also obtain the transportation route data 222 and determine the estimated arrival time based on one or more attributes (e.g., average speed limit, traffic conditions, road conditions, weather conditions, etc.) associated with the transportation route(s) in the vehicle route data 372.

The next destination can indicate a destination of the vehicle 104 after the current destination. The next destination can be based on a cargo route in the cargo route data 378. For example, if the cargo route includes a first transfer hub followed by a second transfer hub and the vehicle computing system 102 determines that the current destination is the first transfer hub, then the vehicle computing system 102 can determine that the next destination is the second transfer hub.

The convoy data 374 can include information associated with a convoy that includes the vehicle 104. The convoy data 374 can indicate whether the vehicle 104 is part of a convoy. If the vehicle 104 is part of a convoy, the convoy data 374 can include, for example, a convoy identifier associated with the convoy, a vehicle identifier associated with a lead vehicle in the convoy, and an escort identifier associated with an escort assigned to the convoy. The vehicle computing system 102 can obtain the convoy data 374 from the operations computing system 120 based on the convoy data 218.

Figure 4:
FIG. 4 depicts an example transportation network according to example embodiments of the present disclosure.

FIG. 4 depicts a diagram of an example transportation network 400 according to example embodiments of the present disclosure. The transportation network 400 can include transfer hubs 410, 412, 414, 416, 418 and 420. The transportation network 400 can include a plurality of locations 470, 471, 472, and 473 that are proximate to the transfer hub 410, and a plurality of locations 480, 481, 482 that are proximate to the transfer hub 420. The plurality of locations 470-473 and 480-482 can be connected to each other and to a proximate transfer hub via one or more local routes. For example, the location 470 can be connected to the transfer hub 410 via local route 491, and the location 480 can be connected to the transfer hub 420 via local route 492. The transportation network 400 can include a plurality of locations (not shown) that are proximate to each of the transfer hubs 412, 414, 416, 418 and that are connected to each other and to a proximate transfer hub via one or more local routes (not shown).

The transfer hubs 410, 412, 414, 416, 418 and 420 in the transportation network 400 can be connected to each other via the transportation routes 431, 432, 433, 434, 435, 436, 437, 438, 439, 440, 441, 442, 443, 444, 445, 446, 447, 448, 449, 450, 451, and 452. For example, transfer hub 410 is connected to transfer hub 414 via transportation route 433, and transfer hub 414 is connected to transfer hub 410 via transportation route 434. As another example, transfer hub 414 is connected to transfer hub 420 via transportation routes 435, 437, and 439, or via transportation routes 451, 445, 449, and 442. In this way, an asset that includes an autonomous vehicle transporting cargo can travel from a first transfer hub to a second transfer hub in the transportation network 400 via a variety of different transportation route combinations.

Figure 5:
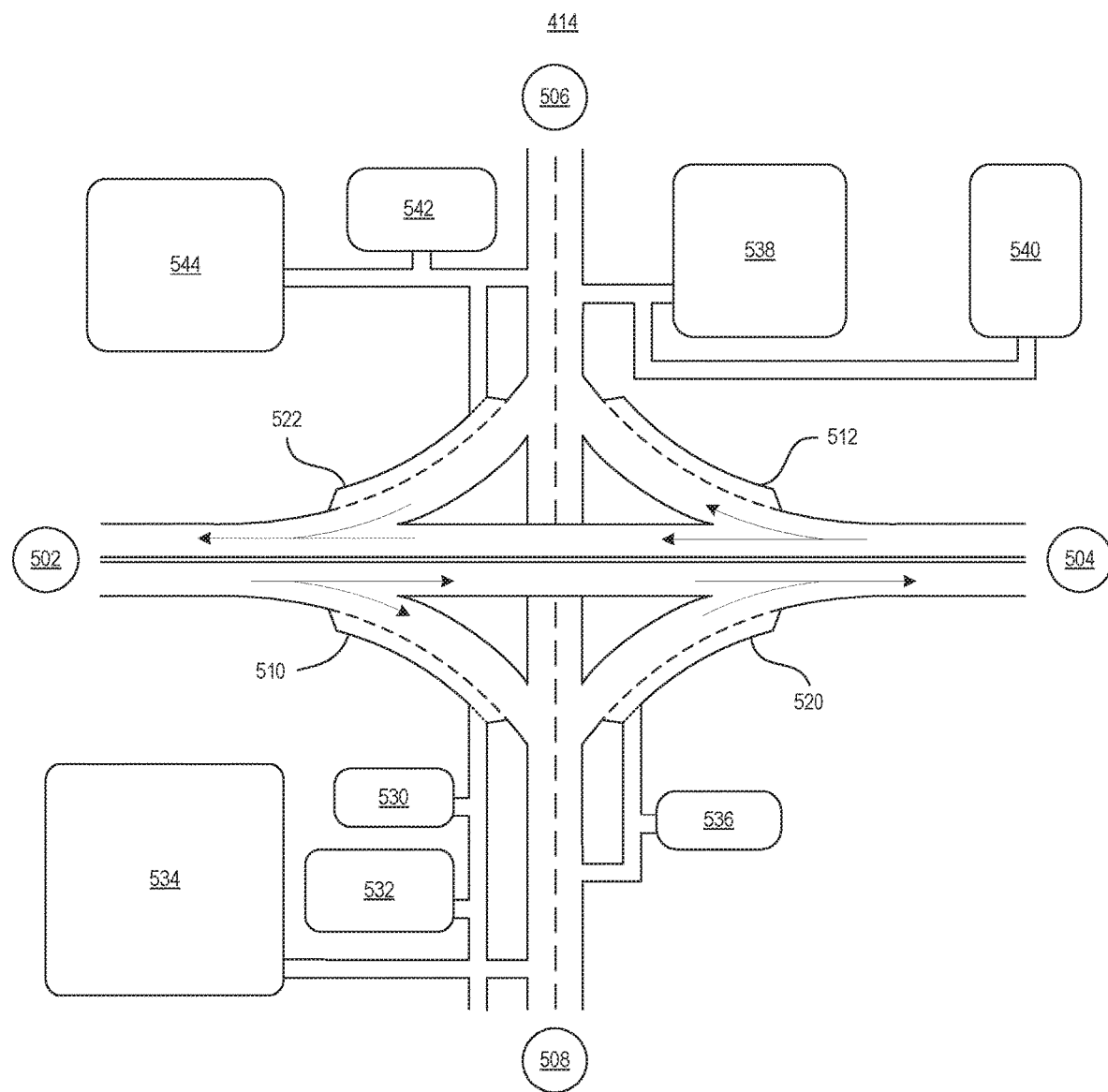
FIG. 5 depicts an example transfer hub according to example embodiments of the present disclosure.

FIG. 5 depicts a diagram of the transfer hub 414 in the transportation network 400 described above with reference to FIG. 4 according to example embodiments of the present disclosure. The transfer hub 414 can be proximate to a highway road connecting a location 502 with another location 504. The transfer hub 414 can also be proximate to a local road connecting a location 506 with another location 508. The locations 502, 504, 506 and 508 can correspond to another transfer hub in the transportation network, or any other location (e.g., pick-up location, drop-off location, geographic location, etc.). The transfer hub 414 can include or be associated with the locations 510, 512, 520, 522, 530, 532, 534, 536, 538, 540, 542, and 544, that can include a landing zone, launch zone, dropyard, or other location.

The transfer hub 414 can include landing zones 510 and 512. The landing zone 510 can be a location for receiving one or more assets (e.g., vehicle 104 and/or vehicle(s) 105) that arrive at the transfer hub 414 from location 502, and the landing zone 512 can be a location for receiving one or more assets that arrive at the transfer hub 414 from location 504. The transportation network computing system 122 can include data indicative of a capacity, available capacity, capacity threshold, geographic coordinates, characteristics, facilities, and/or other attributes associated with each of the landing zones 510 and 512.

The transfer hub 414 can include launch zones 520 and 522. The launch zone 520 can be a location from which one or more assets (e.g., vehicle 104 and/or vehicle(s) 105) can depart the transfer hub 414 toward location 504, and the launch zone 522 can be a location from which the autonomous vehicle(s) can depart the transfer hub 414 toward location 502. The transportation network computing system 122 can include data indicative of a capacity, available capacity, capacity threshold, geographic coordinates, characteristics, facilities, and/or other attributes associated with each of the launch zones 510 and 512.

The transfer hub 414 can include dropyards 530, 532, 534, 536, 538, 540, 542, and 544. The dropyards can be a location for holding one or more assets (e.g., autonomous vehicle(s) and/or cargo) that are located at the transfer hub 414. The asset(s) can include autonomous vehicle(s) (e.g., vehicle 104 and/or vehicle(s) 105) that arrive at the transfer hub 414 from location 502 or 504, and/or cargo being transported by the autonomous vehicle(s). The dropyards 530, 532, 534, 536, 538, 540, 542, and 544 can be associated with one or more attributes, such as, for example, a capacity, available capacity, capacity threshold, geographic coordinates, and characteristics, facilities. The transportation network computing system 122 can include data indicative of the capacity, available capacity, capacity threshold, geographic coordinates, characteristics, facilities, and/or other attributes associated with each of the dropyards 530, 532, 534, 536, 538, 540, 542 and 544.

In an example embodiment of the present disclosure, the service provider network 118 can obtain sensor data from sensor(s) 226 that are located at or associated with transfer hub 414 in the transportation network 400. The service provider network 118 can determine a total capacity and/or an available capacity at one or more locations associated with the transfer hubs 414 based on the sensor data. In particular, the sensor(s) 226 can be configured to generate sensor data that corresponds to landing zone 510 and to provide the sensor data to the service provider network 118. The sensor data can include, for example, audio data, video data, pressure data, motion data, and/or other types data that is indicative of a physical space at the landing zone 510. The service provider network 118 can analyze the sensor data to determine the total capacity associated with the landing zone 510, and identify one or more objects (e.g., vehicle(s), cargo, person(s), safety barrier(s), obstruction(s), etc.) that are occupying the physical space at the landing zone 510. The service provider network 118 can determine the available capacity associated with the landing zone 510 based on the total capacity and the object(s) that are occupying the landing zone 510. In this way, the service provider 118 can determine a total capacity and/or an available capacity at one or more of the locations 510, 512, 520, 522, 534, 536, 538, 540, 542, and 544 associated with the transfer hub 414; and the service provider 118 can determine an available capacity at one or more locations associated with one or more of the transfer hubs 410, 412, 414, 416, 418 and 420 in the transportation network 400.

In another example embodiment of the present disclosure, the service provider network 118 can obtain fleet data 210 and/or cargo route data 216 from the operations computing system(s) 120 to determine an available capacity at the one or more locations associated with the transfer hubs 414 based on the fleet data 210 and/or cargo route data 216. In particular, the service provider network 118 can analyze the fleet data 210 and cargo route data 216 to determine a location of one or more assets that are managed by one or service providers. The service provider network 118 can determine a number of assets that are positioned at the landing zone 510, and determine the available capacity at the landing zone 510 based at least in part on the number of assets and a total capacity at the landing zone 510. In this way, the service provider 118 can determine an available capacity at one or more of the locations 510, 512, 520, 522, 534, 536, 538, 540, 542, and 544 associated with the transfer hub 414; and the service provider 118 can determine an available capacity at one or more locations associated with one or more of the transfer hubs 410, 412, 414, 416, 418 and 420 in the transportation network 400.

In another example embodiments of the present disclosure, the service provider network 118 can obtain transfer schedule data 224 from the transportation network computing system 122 to determine an available capacity at the one or more locations associated with the transfer hubs 410, 412, 414, 416, 418 and 420. In particular, the service provider network 118 can obtain a schedule of one or more assignments for moving one or more assets from landing zone 510 to one or more other locations associated with the transfer hub 414. The service provider network 118 can determine the available capacity at the landing zone 510, for example, by incrementing the available capacity at the landing zone 510 when an asset is moved from the landing zone 510 according to the schedule. In this way, the service provider 118 can determine an available capacity at one or more of the locations 510, 512, 520, 522, 534, 536, 538, 540, 542, and 544 associated with the transfer hub 414; and the service provider 118 can determine an available capacity at one or more locations associated with one or more of the transfer hubs 410, 412, 414, 416, 418 and 420 in the transportation network 400.

FIG. 6 depicts an example of a cargo route 600 associated with cargo being transported using the transportation network 400, according to example embodiments of the present disclosure. The cargo route 600 can be associated with a first asset (A1) that includes a first cargo (C1). The cargo route 600 includes transporting the first cargo from location 470 to transfer hub 410 via local route 491, transporting the first cargo from transfer hub 410 to transfer hub 414 via transportation route 433, transporting the first cargo from transfer hub 414 to transfer hub to transfer hub 418 via transportation routes 435 and 437, transporting the first cargo from transfer hub 418 to transfer hub 420 via transportation route 439, and transporting the first cargo from transfer hub 420 to location 480 via local route 492.

The cargo route 600 also includes a scheduled departure time associated with location 470 (T0) and transfer hubs 410 (T2), 414 (T6), 418 (T8), 420 (T10); and a scheduled arrival time associated with location 480 (T11) and transfer hubs 410 (T1), 414 (T3), 418 (T7), 420 (T9).

An operations computing system 120 can determine the cargo route 600. For example, the operations computing system 120 can receive data indicative of a service request from the client computing system 126. The service request can include the location 470 as a first location associated with the first cargo (e.g., pick-up location) and the location 480 as a second location associated with the first cargo (e.g., drop-off location). The operations computing system 120 can determine that transfer hub 410 is proximate to the location 470 and that transfer hub 420 is proximate to the location 480, based on transfer hub data 220 from the transportation network computing system 122. The operations computing system 120 can determine the cargo route 600 from transfer hub 410 to transfer hub 420 via transfer hubs 414 and 418. The operations computing system 120 can determine the transportation routes 433, 435, 437, and 439 connecting the transfer hubs 410, 414, 418, and 420 based on transportation route data 222 from the transportation network computing system 122.

FIG. 7 depicts an example of a transfer schedule 700 associated with transfer hub 414 in the transportation network 400, according to example embodiments of the present disclosure. The transfer schedule 700 includes a plurality of assignments for moving one or more assets from a starting location (e.g., first location associated with the transfer hub 414) to an ending location (e.g., second location associated with transfer hub 414) at a scheduled time, and a jockey identifier associated with a jockey that is assigned to each assignment. A scheduled time associated with one or more assets can indicate an arrival time associated with the asset(s) that is equal to or before the scheduled time. For example, the scheduled time T1 associated with moving one or more second assets (A2) can indicate an arrival time associated with the second asset(s) that is equal to or before time T1.

In particular, the transfer schedule 700 includes an assignment for moving one or more first assets (A1) at time T3. The first asset(s) can include the first cargo (C1) discussed above with respect to FIG. 6. The first asset(s) (that includes the first cargo) can arrive at the landing zone 510 associated with the transfer hub 414 at time T3, and the operations computing system 120 can direct a jockey (J5) to move the first asset(s) from the landing zone 510 to the dropyard 530 when the first asset(s) arrive at time T3. The transfer schedule 700 includes an assignment for a jockey (J6) to move the first asset(s) from the dropyard 530 to the launch zone 520 at time T6. The first asset(s) (that includes the first cargo) can depart the transfer hub 414 from the launch zone 520 at time T6 toward transfer hub 418.

The transfer schedule 700 also includes an assignment for a jockey (J4) to move one or more seventh assets (A7) and one or more eight assets (A8) from the landing zone 512 to the dropyard 542. The operations computing system 120 can group the seventh asset(s) and the eighth asset(s) at the landing zone 512 so that the jockey can moved the seventh and eighth asset(s) together as a group from the landing zone 512 to the dropyard 542.

Figure 8:
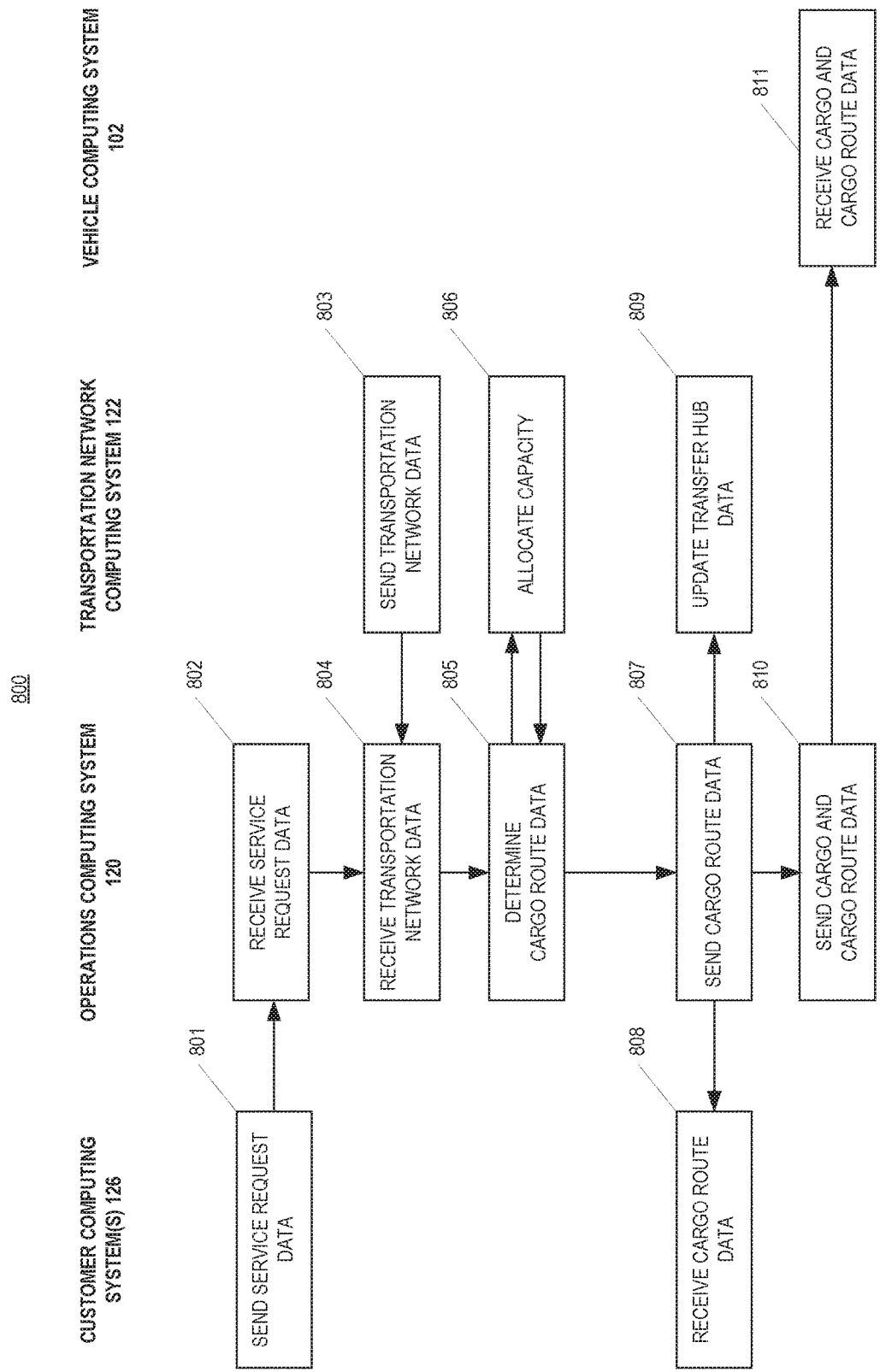
FIG. 8 depicts an example flow diagram of monitoring, estimating, and/or controlling an available capacity at a transfer hub according to example embodiments of the present disclosure.
Figure 9:
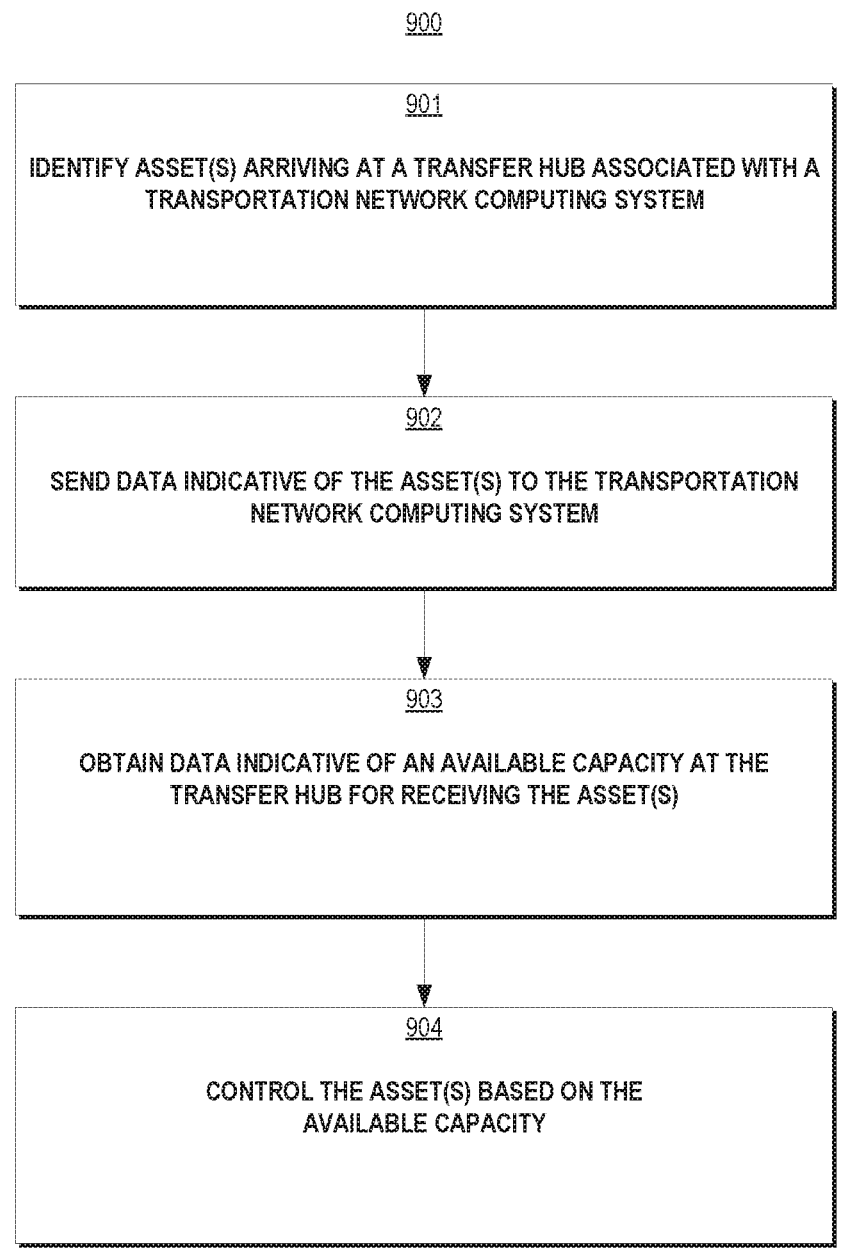
FIG. 9 depicts a first flow diagram of managing available capacity at a location for receiving an autonomous vehicle according to example embodiments of the present disclosure.
Figure 10:
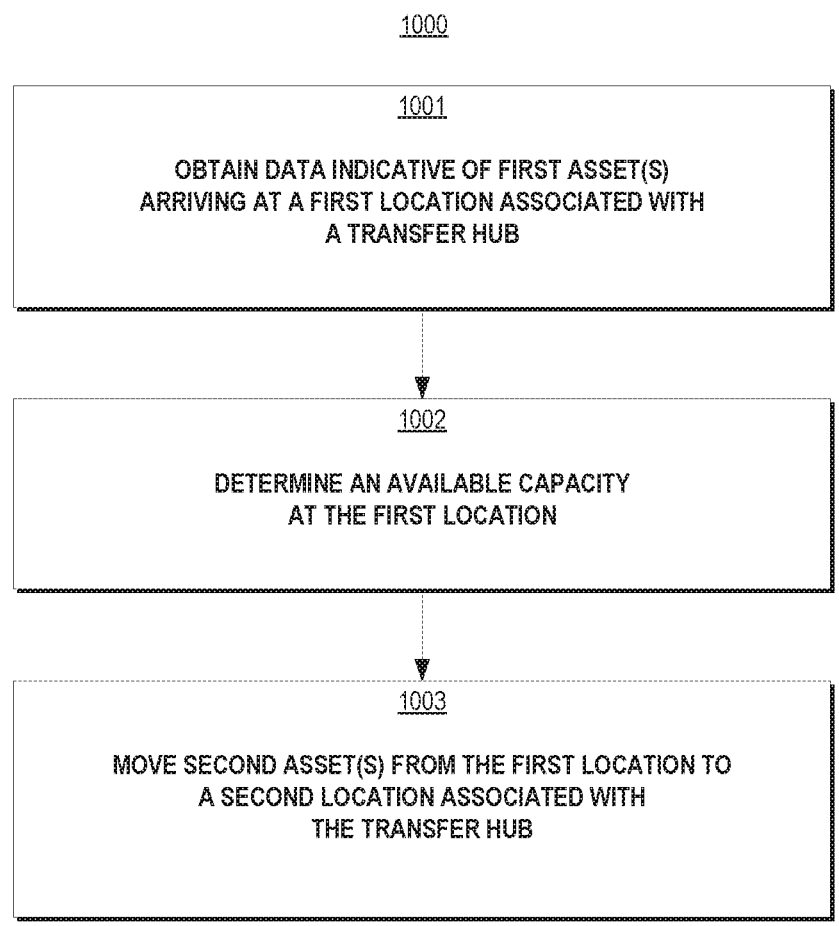
FIG. 10 depicts a second flow diagram of managing available capacity at a location for receiving an autonomous vehicle according to example embodiments of the present disclosure.

FIGS. 8, 9, and 10 depict flow diagrams of example methods 800, 900 and 1000 for providing a vehicle-based service according to example embodiments of the present disclosure. One or more portion(s) of the methods 800, 900 and 1000 can be implemented as operations by one or more computing system(s) such as, for example, one or more computing systems of the service provider network 118 (e.g., the operations computing system 120, the transportation network computing system 122, and/or the jockey management computing system 124) and/or any other suitable systems, such as computing system(s) 102, 126, 1101, and 1110 shown in FIGS. 1, 2, 3, and 11. For example, FIGS. 8, 9, and 10 illustrate certain operations being performed by specific computing systems described herein. However, it should be appreciated that such operations may generally be performed by any suitable computing system or combination of computing systems consistent with the disclosure provided herein. Moreover, one or more portion(s) of the methods 800, 900 and 1000 can be implemented as an algorithm on the hardware components of the system(s) described herein (e.g., as in FIGS. 1, 2, 3, and 11), for example, to monitor, estimate, and/or control an available capacity at a transfer hub for receiving one or more assets (e.g., autonomous vehicle(s) and/or cargo). FIGS. 8, 9, and 10 depict elements performed in a particular order for purposes of illustration and discussion. Those of ordinary skill in the art, using the disclosures provided herein, will understand that the elements of any of the methods (e.g., of FIGS. 8, 9 and 10) discussed herein can be adapted, rearranged, expanded, omitted, combined, and/or modified in various ways without deviating from the scope of the present disclosure.

FIG. 8 depicts an example flow diagram of monitoring, estimating, and/or controlling an available capacity at a transfer hub according to example embodiments of the present disclosure. At (801), the client computing system 126 can send data indicative of a service request to the operations computing system 120.

At (802), the operations computing system 120 can receive data indicative of the service request from the client computing system 126 for transporting cargo from a first location (e.g., pick-up location) to a second location (e.g., drop-off location). The data indicative of the service request can include the first location, the second location, and information associated with the cargo, and the operations computing system 120 can store the data in the service request data 212 and cargo data 214.

At (803), the transportation network computing system 122 can send transfer hub data 220 and transportation route data 222 to the operations computing system 120.

At (804), the operations computing system 120 can receive the transfer hub data 220 and transportation route data 222 from the transportation network computing system 122.

At (805), the operations computing system 120 can determine a cargo route for the cargo based on the service request data 212, transfer hub data 220, and transportation route data 222. The operations computing system 120 can determine one or more transportation routes to transport the cargo from the first location to the second location via a plurality of transfer hubs. The operations computing system 120 can also determine a scheduled arrival time and a scheduled departure time for the cargo at each of the transfer hubs. The operations computing system 120 can determine an available capacity at each of the transfer hubs for receiving a first asset that includes the cargo at a scheduled arrival time associated with the transfer hub. If the an available capacity at a first transfer hub for receiving the first asset at a scheduled arrival time associated with the first transfer hub is insufficient, then the operations computing system 120 can expedite or delay the scheduled arrival time associated with the first transfer hub to a new scheduled arrival time when the available capacity is sufficient. Alternatively, the operations computing system 120 can determine a different cargo route that does not include the first transfer hub. Alternatively, the operations computing system 120 can send a request to the transportation network computing system 122 for an allocation of capacity to receive the first asset at the scheduled arrival time. If the operations computing system 120 receives a notification from the transportation network computing system 122 that the allocation failed, then the operations computing system 120 can expedite or delay the scheduled arrival time associated with the first transfer hub and/or determine a different cargo route that does not include the first transfer hub. The operations computing system 120 can store the determined cargo route in cargo route data 216.

At (806), in response to the receiving the request for an allocation of capacity, the transportation network computing system 122 can allocate capacity at the first transfer hub, and provide data indicative of the allocation to the operations computing system 120. If required, the transportation network computing system 122 can communicate with the jockey management computing system 124 to direct a jockey to move one or more assets and/or schedule an assignment for a jockey to move one or more assets, in order to increase an available capacity at the first transfer hub for allocating the available capacity. If the transportation network computing system 122 is unable to allocate capacity at the first transfer hub for receiving the first asset at the scheduled arrival time, then the transportation network computing system 122 can notify the operations computing system 120 that the allocation failed.

At (807), the operations computing system 120 can send data indicative of the cargo route to the client computing system 126. In particular, the operations computing system 120 can send data indicative of a first transfer hub proximate to the first location and a second transfer hub proximate to the second location. The operations computing system 120 can also send data indicative of the scheduled arrival time for the cargo at the first transfer hub and at the second transfer hub.

At (808), the client computing system 126 can receive data indicative of the cargo route. A client associated with the client computing system 126 can transport the cargo from the first location to the first transfer hub at the scheduled arrival time (or before the scheduled arrival time) for the cargo at the first transfer hub, and transport the cargo from the second transfer hub to the second location at the scheduled arrival time (or after the scheduled arrival time) for the cargo at the second transfer hub.

At (809), the operations computing system 120 can send data indicative of the cargo route to the transportation network computing system 122. The transportation network computing system 122 can update an available capacity associated with each of the transfer hubs in the cargo route in accordance with a scheduled arrival time of the first asset at the transfer hub, and store the updated information in transfer hub data 809.

At (810), the operations computing system 120 can select the vehicle 104 to transport the cargo, and can send data associated with the cargo in cargo data 214 and cargo route data 216 to the vehicle computing system 102.

At (811), the vehicle computing system 102 can receive data associated with the cargo, store the data in cargo data 376 and cargo route data 378, and control the vehicle 104 to autonomously transport the cargo from the first transfer hub to the second transfer hub.

FIG. 9 depicts an example flow diagram of a method 900 for monitoring an available capacity at a transfer hub to provide a vehicle-based service, according to example embodiments of the present disclosure. At (901), the method 900 can include identifying one or more assets arriving at a transfer hub associated with a transportation network computing system. For example, an operations computing system 120 can identify one or more assets that will arrive at a first location associated with a first transfer hub at an arrival time.

At (902), the method 900 can include sending data indicative of the asset(s) to the transportation network computing system. For example, the operations computing system 120 can send data indicative of the asset(s) to the transportation network computing system 122 that is associated with the first transfer hub. The operations computing system 120 can send data that includes a request for the transportation network computing system 122 to allocate capacity at the first location for receiving the asset(s).

At (903), the method 900 can include obtaining data indicative of an available capacity at the transfer hub for receiving the asset(s). For example, the operations computing system 120 can obtain data indicative of an available capacity associated with the first location for receiving the asset(s) at the arrival time from the transportation network computing system 122.

At (904), the method 900 can include controlling the asset(s) based on the available capacity. For example, the operations computing system 120 can control the asset(s) based at least in part on the available capacity associated with the first location for receiving the asset(s) at the available time. The operations computing system 120 can control the asset(s) to adjust the arrival time of the asset(s) at the first location (e.g., expedite or delay the arrival time with respect to the first time) if the available capacity at the arrival time is insufficient. Alternatively, the operations computing system 120 can control the asset(s) to divert the asset(s) to a second transfer hub (e.g., a second location associated with the second transfer hub) as opposed to the first transfer hub, if the available capacity at the arrival time is insufficient.

FIG. 10 depicts an example flow diagram of a method 1000 for monitoring, estimating, and/or controlling an available capacity at a transfer hub according to example embodiments of the present disclosure. At (1001), the method 1000 can include obtaining data indicative of one or more first assets arriving at a first location associated with a transfer hub. For example, the service provider network 118 can obtain data indicative of one or more first assets that will arrive at a first location associated with a first transfer hub at an arrival time. The service provider network 118 can obtain the data from an operations computing system 120 that manages the first asset(s). The service provider network 118 can receive data indicative of a request for allocating capacity at the first location to receive the first asset(s).

At (1002), the method 1000 can include determining an available capacity at the first location. For example, the service provider network 118 can determine an available capacity at the first location for receiving the first asset(s) at the first time. The service provider network 118 can obtain data indicative of a total capacity associated with the first location (e.g., predetermined information associated with the first location and/or sensor data from the sensor(s) 226). The service provider network 118 can obtain data indicative of one or more objects positioned at the first location (e.g., one or more second assets positioned at the first location) from one or more cameras or sensors associated with the first location. The service provider network 118 can determine an available capacity associated with the first location based on the total capacity and the object(s) positioned at the first location (e.g., one or more second assets positioned at the first location). The service provider network 118 can obtain data indicative of a plurality of assets that will arrive at the first location between a current time and the arrival time, and obtain data indicative of a transfer schedule for moving one or more assets in the plurality of assets away from the first location between the current time and the arrival time. The service provider network 118 can estimate the available capacity associated with the first location based at least in part on the data indicative of the plurality of assets and the transfer schedule. In particular, the service provider network 118 can obtain vehicle route data 372 associated with one or more of the plurality of assets, and the service provider network 118 can determine that one or more of the plurality of assets is positioned at the first location if a vehicle location in the vehicle route data 372 corresponds to the first location. The plurality of assets can be managed by one or more of the operations computing system(s) 120.

At (1003), the method 1000 can include moving one or more second asset(s) from the first location to a second location associated with the transfer hub. For example, the service provider network 118 can move one or more second assets positioned at the first location to a second location associated with the first transfer hub to increase the available capacity at the first location for receiving the first asset(s) at the arrival time. The service provider network 118 can direct the second asset(s) to be moved at a current time, or schedule an assignment for a jockey to move the second asset(s) at a future time before the arrival time.

FIG. 11 depicts an example computing system 1100 according to example embodiments of the present disclosure. The example system 1100 illustrated in FIG. 11 is provided as an example only. The components, systems, connections, and/or other aspects illustrated in FIG. 11 are optional and are provided as examples of what is possible, but not required, to implement the present disclosure. The example system 1100 can include the vehicle computing system 102 of the vehicle 104 and, in some implementations, remote computing system(s) 1110 including one or more remote computing system(s) that are remote from the vehicle 104 (e.g., one or more computing systems of the service provider network 118) that can be communicatively coupled to one another over one or more networks 1120. The remote computing system 1110 can be associated with a central operations system and/or an entity associated with the vehicle 104 such as, for example, a vehicle owner, vehicle manager, fleet operator, service provider network, etc.

The computing device(s) 1101 of the vehicle computing system 102 can include processor(s) 1102 and a memory 1104. The one or more processors 1102 can be any suitable processing device (e.g., a processor core, a microprocessor, an ASIC, a FPGA, a controller, a microcontroller, etc.) and can be one processor or a plurality of processors that are operatively connected. The memory 1104 can include one or more non-transitory computer-readable storage media, such as RAM, ROM, EEPROM, EPROM, one or more memory devices, flash memory devices, etc., and combinations thereof.

The memory 1104 can store information that can be accessed by the one or more processors 1102. For instance, the memory 1104 (e.g., one or more non-transitory computer-readable storage mediums, memory devices) on-board the vehicle 104 can include computer-readable instructions 1106 that can be executed by the one or more processors 1102. The instructions 1106 can be software written in any suitable programming language or can be implemented in hardware. Additionally, or alternatively, the instructions 1106 can be executed in logically and/or virtually separate threads on processor(s) 1102.

For example, the memory 1104 on-board the vehicle 104 can store instructions 1106 that when executed by the one or more processors 1102 on-board the vehicle 104 cause the one or more processors 1102 (the vehicle computing system 102) to perform operations such as any of the operations and functions of the vehicle computing system 102, as described herein, one or more operations of methods 800 and 900, and/or any other operations and functions of the vehicle computing system 102, as described herein.

The memory 1104 can store data 1108 that can be obtained, received, accessed, written, manipulated, created, and/or stored. The data 1108 can include, for instance, data associated with perception, prediction, motion plan, maps, vehicle diagnostics, vehicle route, vehicle convoy, cargo, cargo route, vehicle fleet, service request, transfer hub, transportation route, jockey, and/or other data/information as described herein. In some implementations, the computing device(s) 1101 can obtain data from one or more memory device(s) that are remote from the vehicle 104.

The computing device(s) 1101 can also include a communication interface 1103 used to communicate with one or more other system(s) on-board the vehicle 104 and/or a remote computing device that is remote from the vehicle 104 (e.g., of remote computing system(s) 1110). The communication interface 1103 can include any circuits, components, software, etc. for communicating via one or more networks (e.g., 1120). In some implementations, the communication interface 1103 can include, for example, one or more of a communications controller, receiver, transceiver, transmitter, port, conductors, software, and/or hardware for communicating data.

The network(s) 1120 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 1120 can be accomplished, for instance, via a communication interface using any type of protocol, protection scheme, encoding, format, packaging, etc.

The remote computing system 1110 can include one or more remote computing devices that are remote from the vehicle computing system 102. The remote computing devices can include components (e.g., processor(s), memory, instructions, data) similar to that described herein for the computing device(s) 1101. Moreover, the remote computing system(s) 1110 can be configured to perform one or more operations of the service provider network 118, as described herein. Moreover, the computing systems of other vehicles described herein can include components similar to that of vehicle computing system 112.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for monitoring an available capacity at a location to provide a vehicle-based service, the method comprising:
    identifying, by a computing system that includes one or more computing devices, one or more assets that will arrive at a first location within a first transfer hub at an arrival time;
    sending, by the computing system, data indicative of the one or more assets to a transportation network computing system associated with the first transfer hub;
    obtaining, by the computing system, data indicative of an available capacity at the first location for receiving the one or more assets at the arrival time; and
    controlling, by the computing system, the one or more assets to adjust the arrival time of the one or more assets at the first location based at least in part on the available capacity at the first location for receiving the one or more assets.

2. The computer-implemented method of claim 1, wherein sending data indicative of the one or more assets to a transportation network computing system associated with the first transfer hub comprises:
    sending, by the computing system, a request to the transportation network computing system to allocate capacity for receiving the one or more assets at the first location within the first transfer hub.

3. The computer-implemented method of claim 1, wherein controlling the one or more assets based at least in part on the available capacity comprises:
    controlling, by the computing system, the one or more assets to divert the one or more assets to a second transfer hub as opposed to the first transfer hub.

4. A computer-implemented method for managing available capacity at a location for receiving an asset, the method comprising:
    obtaining, by a computing system that includes one or more computing devices, data indicative of one or more first assets that will arrive at a first location within a first transfer hub at an arrival time, the one or more first assets being associated with a first service provider;
    obtaining, by the computing system, data indicative of a plurality of assets that will arrive at the first location between a current time and the arrival time, the plurality of assets associated with a plurality of service providers that include the first service provider;
    obtaining, by the computing system, data indicative of a transfer schedule for moving one or more assets in the plurality of assets away from the first location between the current time and the arrival time;
    determining, by the computing system, an available capacity at the first location within the first transfer hub for receiving the one or more first assets at the arrival time based, at least in part, on the data indicative of the plurality of assets that will arrive at the first location and the transfer schedule; and
    moving, by the computing system, one or more second assets positioned at the first location to a second location within the first transfer hub to increase the available capacity at the first location for receiving the one or more first assets at the arrival time.

5. The computer-implemented method of claim 4, wherein obtaining data indicative of the one or more first assets that will arrive at the first location within the first transfer hub at the arrival time comprises:
    receiving, by the computing system, a request for allocating capacity at the first location to receive the one or more first assets.

6. The computer-implemented method of claim 4, wherein determining the available capacity at the first location within the first transfer hub for receiving the one or more first assets at the arrival time comprises:
    obtaining, by the computing system, data indicative of a total capacity associated with the first location;
    obtaining, by the computing system, data indicative of the one or more second assets positioned at the first location from at least one of a camera or a sensor associated with the first location; and
    determining, by the computing system, the available capacity based at least in part on the total capacity and the one or more second assets.

7. The computer-implemented method of claim 4, wherein the data indicative of the plurality of assets includes a vehicle location associated with one or more assets in the plurality of assets.

8. The computer-implemented method of claim 4, wherein moving the one or more second assets at the first location to the second location within the first transfer hub to increase the available capacity at the first location for receiving the one or more first assets that will arrive at the arrival time comprises:
    scheduling, by the computing system, an assignment for a jockey to move the one or more second assets from the first location to the second location.

9. A computing system for monitoring an available capacity at a location to provide a vehicle-based service, the computing system comprising:
    one or more processors; and
    one or more tangible, non-transitory, computer readable media that collectively store instructions that when executed by the one or more processors cause the computing system to perform operations, the operations comprising:
        identifying one or more first assets scheduled to arrive at a first location within a first transfer hub at an arrival time;
        sending data indicative of the one or more first assets to a transportation network computing system associated with the first transfer hub;
        obtaining data indicative of an available capacity at the first location for receiving the one or more first assets at the arrival time; and
        controlling the one or more first assets to adjust the arrival time of the one or more assets at the first location based at least in part on the available capacity at the first location for receiving the one or more assets.

10. The computing system of claim 9, wherein sending data indicative of the one or more first assets to a transportation network computing system associated with the first transfer hub comprises:
    sending a request to the transportation network computing system to allocate capacity for receiving the one or more first assets at the first location within the first transfer hub.

11. The computing system of claim 9, wherein controlling the one or more first assets based at least in part on the available capacity comprises:
    controlling the one or more first assets to divert the one or more first assets to a second transfer hub as opposed to the first transfer hub.

12. A computing system for managing available capacity at a location for receiving an asset, the computing system comprising:
one or more processors; and
one or more tangible, non-transitory, computer readable media that collectively store instructions that when executed by the one or more processors cause the computing system to perform operations, the operations comprising:
obtaining data indicative of one or more first assets scheduled to arrive at a first location within a first transfer hub at an arrival time, the one or more first assets being associated with a first service provider;
obtaining, by the computing system, data indicative of a plurality of assets that will arrive at the first location between a current time and the arrival time, the plurality of assets associated with a plurality of service providers that include the first service provider;
obtaining, by the computing system, data indicative of a transfer schedule for moving one or more assets in the plurality of assets away from the first location between the current time and the arrival time;
determining an available capacity at the first location within the first transfer hub for receiving the one or more first assets at the arrival time based, at least in part, on the data indicative of the plurality of assets that will arrive at the first location and the transfer schedule; and
moving one or more second assets positioned at the first location to a second location within the first transfer hub to increase the available capacity at the first location for receiving the one or more first assets at the arrival time.

13. The computing system of claim 12, wherein obtaining data indicative of the one or more first assets scheduled to arrive at the first location within the first transfer hub at the arrival time comprises:
receiving a request for space at the first location to receive the one or more first assets.

14. The computing system of claim 12, wherein determining the available capacity at the first location within the first transfer hub for receiving the one or more first assets at the arrival time comprises:
obtaining data indicative of a total capacity associated with the first location;
obtaining data indicative of the one or more second assets positioned at the first location from at least one of a camera or a sensor associated with the first location; and
determining the available capacity based at least in part on the total capacity and the one or more second assets.

15. The computing system of claim 12, wherein the data indicative of the plurality of assets includes a vehicle location associated with one or more assets in the plurality of assets.

16. The computing system of claim 12, wherein moving the one or more second assets at the first location to the second location within the first transfer hub to increase the available capacity at the first location for receiving the one or more first assets scheduled to arrive at the arrival time comprises:
scheduling an assignment for a jockey to move the one or more second assets from the first location to the second location at a time before the arrival time.

* * * * *